(12) United States Patent
Toshimitsu et al.

(10) Patent No.: US 7,436,800 B2
(45) Date of Patent: Oct. 14, 2008

(54) RADIO COMMUNICATION SCHEME

(75) Inventors: Kiyoshi Toshimitsu, Kanagawa (JP); Akihiro Tsujimura, Kanagawa (JP); Kuniaki Ito, Kanagawa (JP); Shuichi Obayashi, Kanagawa (JP); Hiroki Shoki, Kanagawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

(21) Appl. No.: 11/295,604

(22) Filed: Dec. 7, 2005

(65) Prior Publication Data

US 2006/0072501 A1    Apr. 6, 2006

Related U.S. Application Data

(63) Continuation of application No. 09/734,598, filed on Dec. 13, 2000, now Pat. No. 7,006,465.

(30) Foreign Application Priority Data

Dec. 15, 1999    (JP)    ............................ 11-356632

(51) Int. Cl.
*H04Q 7/00*    (2006.01)
(52) U.S. Cl. .................. 370/328; 370/331; 370/339; 455/436; 455/456.1; 340/928; 340/936; 342/368; 343/824; 343/893
(58) Field of Classification Search ............... 370/310, 370/328, 329, 331, 332, 334, 339; 455/436, 455/437, 439, 440, 441, 456.1
See application file for complete search history.

(56) References Cited

U.S. PATENT DOCUMENTS

| | | | |
|---|---|---|---|
| 5,701,583 A | 12/1997 | Harbin et al. .................. 455/25 |
| 5,894,598 A | 4/1999 | Shoki ....................... 455/562.1 |
| 5,933,096 A * | 8/1999 | Tsuda ......................... 340/928 |
| 6,021,329 A | 2/2000 | Kornestedt et al. .......... 455/446 |
| 6,104,936 A * | 8/2000 | Kronestedt ................ 455/562.1 |
| 6,249,249 B1 | 6/2001 | Obayashi et al. ............. 342/371 |
| 6,304,214 B1 * | 10/2001 | Aiken et al. ................. 342/362 |
| 6,512,481 B1 | 1/2003 | Velazquez et al. ............ 342/367 |
| 6,597,927 B1 * | 7/2003 | Eswara et al. ............... 370/334 |
| 6,657,554 B1 * | 12/2003 | Terashima et al. ........... 340/928 |
| 6,694,154 B1 | 2/2004 | Molnar et al. ............. 455/562.1 |
| 6,741,859 B2 * | 5/2004 | Otsuka et al. ............... 455/438 |
| 6,823,174 B1 * | 11/2004 | Masenten et al. ........... 455/63.4 |
| 7,006,465 B2 * | 2/2006 | Toshimitsu et al. .......... 370/328 |

FOREIGN PATENT DOCUMENTS

| | | |
|---|---|---|
| JP | 09-035185 | 2/1997 |
| JP | 9-167990 | 6/1997 |
| JP | 10-107721 | 4/1998 |
| JP | 10-145286 | 5/1998 |
| JP | 10-261193 | 9/1998 |
| JP | 10-261992 | 9/1998 |
| JP | 2001-69070 | 3/2001 |
| WO | WO 98/16077 | 4/1998 |

* cited by examiner

*Primary Examiner*—Chi H. Pham
*Assistant Examiner*—Shick Hom
(74) *Attorney, Agent, or Firm*—Oblon, Spivak, McClelland, Maier & Neustadt, P.C.

(57) ABSTRACT

In this second radio channel setting example, the grouping is done for each radio mobile stations 98 running on the same lane. A different radio channel is assigned to each group. Accordingly, this prevents the beam patterns using the same channel from intersecting with each other (interfering with each other). Actually, as shown in FIG. 10B, the pas or the pursuit does not occur between the radio mobile stations 98. Thus, the same radio channel is assigned to each radio mobile stations 98 running on the same lane so as to avoid the interference in the same radio channel. Hence, the same radio channel can be repeatedly used.

3 Claims, 19 Drawing Sheets

RADIO COMMUNICATION SCHEME

CROSS REFERENCE TO THE RELATED APPLICATION

The subject application is related to subject matter disclosed in the Japanese Patent Application No. Heill-356632 filed in Dec. 15, 1999 in Japan, to which the subject application claims priority under the Paris Convention and which is incorporated by reference herein.

BACKGROUND OF THE INVENTION

1. Field of the Invention

The present invention relates to a radio communication system, a radio communication method, a radio base station controller and a radio mobile station which are used in a mobile communication service and the like. More particularly, the present invention relates to a technique for keeping a communication even if a radio mobile station is moved in a radio communication system, namely, a hand-over technique.

2. Description of the Related Art

FIG. 1 shows an example of a radio communication system in which a plurality of base stations are connected to a mobile services switching center. As shown in FIG. 1, a territory (service area) to which a mobile communication network 200 gives a service is divided into radio zones 204 referred to as cells by a number of base stations (BS) 202 and covered by them. Several base stations 202 are bundled by a mobile services switching center (MSC) 206, and managed and controlled by each mobile services switching center 206. A mobile station (MS) 208 carries out a radio communication with any of many base stations 202, and switches a base station 202 of a communication partner, in conjunction with its movement. Also, a gateway mobile services switching center (G-MSC) 210 functions as a relay point when the mobile communication network 200 is mutually connected to another fixed network 212. The mobile communication network 200 is connected through the gateway mobile services switching center 210 to another fixed network 212.

Here, when the mobile station 208 crosses one cell 204 during a communication, the continuation of the communication with the base station 202 requires a switching of a communication line, namely, a hand-over process for changing the base station 202 connected to the mobile station 208. In the system shown in FIG. 1, the hand-over process is carried out in accordance with a control signal (for example, a message for a hand-over) outputted to the mobile services switching center 206 through the base station 202 during the connection from the mobile station 208.

However, if a radius of a cell covered by each base station 202 is small, a switching opportunity of a communication line is frequently done, which requires a very complex process. Especially, in a case of AHS (Advanced cruise-assist Highway System) remarked as one of Intelligent Transport Systems (ITS), a radius of a cell is very small such as 50 m to 100 m at most. Thus, the switching frequency of the communication line of the mobile station 208 becomes very high. In short, a period while a car moving at a high speed stays within one cell is very short so that the hand-over process must be frequently done. If the conventional hand-over technique is applied to such AHS, a rate of the hand-over process occupying the communication process becomes very large. This results in a problem that a communication efficiency becomes very poor.

Moreover, the AHS is a system for assisting an automatic run of a car. Thus, a high reliability is required of the AHS. Hence, the continuation of a communication at a time of a movement between cells is an essential function in the AHS. So, a failure of the hand-over is not permitted. However, the conventional hand-over technique does not insure the reservation of a communication line in a hand-over destination, namely, a movement destination. In short, if the communication lines at the hand-over destination are all used, a car during a communication can not carry out the hand-over. This results in a problem that the communication with the base station is interrupted.

As mentioned above, the frequency of the hand-over process becomes very high in the radio communication system, such as the AHS or the like, in which an area (cell) covered by one base station is narrow and a fast mobile body is targeted. Thus, the conventional hand-over technique has the problems of a deterioration in a communication efficiency and a low reliability of a communication.

SUMMARY OF THE INVENTION

The present invention is proposed in view of the above mentioned circumstances. It is therefore an object of the present invention to provide a radio base station controller and a radio mobile station which can simplify a control of a hand-over process and improve a communication efficiency and attain a high reliability of a communication, and a radio communication system and a radio communication method which use them.

In order to attain the above-mentioned objects, the first feature of the present invention lies in a radio communication system comprising: at least one mobile station; a plurality of base stations configured to generate a plurality of beam patterns; and a base station controller which is connected to the plurality of base stations, and then assigns a fixed channel to each mobile station, controls the beam patterns of the base stations and accordingly carries out a radio communication with the mobile station, the base station controller having a device which when carrying out a transmission and a reception to and from a different mobile station to which the same channel is assigned, controls the beam patterns so that the channels do not interfere with each other.

According to this first invention, one base station controller controls the beam pattern of any of the plurality of managed base stations, and directly carries out the radio communication with the mobile station through the radio base station. That is, a signal to be transmitted to the radio mobile station is modulated within the radio base station controller, and transmitted through the radio base station to the radio mobile station. On the other hand, a signal transmitted from the radio mobile station is received through the radio base station, and its signal is demodulated within the radio base station controller. Then, the radio base station controller further assigns a fixed channel (radio channel) to each of the radio mobile stations, and does not change its channel within the managed area, as a rule. In short, the base station controller controls the modulation/demodulation of the transmission/reception signal, and the beam pattern of each of the radio base stations, and assigns a fixed radio channel to each of the radio mobile stations between the managing radio base stations. Thus, the radio base station controller can control the hand-over process of the radio mobile station between the radio base stations. Moreover, it is possible to make its control easier. Hence, it is possible to make the hand-over process of the radio mobile station effective, and also possible to improve the reliability of the communication between the radio base station and the radio mobile station.

The first feature of the present invention is very effective, especially when it is applied to a system in which the radio mobile station moves at a high speed and a moving speed of the radio mobile station is fixed. For example, it is the AHS (Advance cruise-assist Highway System) described in the prior art. In this case, the radio mobile station is a car running on a road, or a mobile mobile station installed in the car. The radio base stations are arranged at a constant interval along the road. The movement destination (hand-over destination) of the radio mobile station can be predicted on an expressway having many straight portions and the like. Correspondingly to it, the hand-over process can be easily controlled, which enables the reliability of the communication to be further improved.

In the first feature of the present invention, the radio base station controller controls the beam patterns of the respective radio base stations, and protects the mutual interference in the same radio channel. Thus, it can use the same radio channel in the different radio mobile stations to thereby carry out the transmission/reception. Hence, the same radio channel can be repeatedly used to thereby attain the effective use of a frequency.

The second feature of the present invention lies in a radio base station controller according to the radio base station controller described in the first feature, which is connected to a plurality of base stations configured to generate a plurality of beam patterns, and then controls an antenna that is installed in each of the base stations and composed of a plurality of antenna devices, and accordingly carries out a radio communication with a mobile station. The radio base station controller comprises: an antenna controller configured to control the antenna in each of the base stations; and at least one modulating/demodulating device configured to modulate and demodulate a signal which is transmitted to and received from the mobile station.

According to this second invention, the radio base station controller can control the antenna of each radio base station and directly carry out the radio communication with the radio mobile station through each radio base station. Here, the antenna composed of the plurality of antenna devices implies an adaptive array antenna, a smart antenna or the like in which the plurality of antenna devices are mounted. So, it can generate the plurality of beam patterns, pursue and scan the moving radio mobile station. Actually, the optimal beam pattern can be generated by setting a weight for the antenna device of each radio base station used for the transmission/reception.

As described in the first feature, when the transmission/reception is done by using the same radio channel in the different radio mobile stations, this setting of the weight can protect the beam patterns from interfering with each other.

The third feature of the present invention also lies in a radio base station controller according to the radio base station controller described in the first feature, which is connected to a plurality of base stations arranged along a road, and then controls the plurality of base stations, and accordingly carries out a radio communication with at least one mobile station running on the road. So, it comprises: a device configured to assign the same channel to each mobile station of the same speed or the same lane; a device configured to detect at least one of the speed and the lane of the mobile station; and a device which when the speed or the lane of the mobile station is changed, changes an assignment channel, in accordance with a speed or a lane after the change.

The third feature of the present invention actually lies in the setting example of the radio channel assigned to each radio mobile station, as described in the first feature. Here, the same speed and the same lane do not require that they are perfectly equal, and it is enough that they are substantially equal. Actually, they imply the range in which the mutual interference in the same radio channel, such as the pass, the pursue and the like, is not induced between the radio mobile stations (cars) running on the road.

According to the third invention, the assignment of the same radio channel for each radio mobile station having the same moving speed and lane enables the same radio channel to be repeatedly used without any mutual interference. Thus, the usage efficiency of the frequency can be improved so that the base station controller can reserve a larger number of channels.

The fourth feature of the present invention lies in a radio base station controller which is connected to a plurality of base stations arranged along a road, and then controls the plurality of base stations and accordingly carries out a radio communication with at least one mobile station running on the road. Then, in the radio base station controllers, a boundary between radio base station controllers adjacent to each other is positioned in a portion in which a movement destination of the mobile station on the road can be pointed out. Here, the boundary between the radio base station controllers adjacent to each other implies a boundary between areas covered by the respective radio base station controllers constituted by the set of management areas of the radio base stations controlled by the respective radio base station controllers.

According to the fourth invention, the hand-over destination (movement destination) of the radio mobile station between the radio base station controllers can be pointed out to thereby make the control of the hand-over process in the radio mobile station easier.

The fifth feature of the present invention lies in a radio communication system comprising: at least one mobile station having a device configured to select, from a plurality of same reception signals, a reception signal in which a reception state is superior; a first base station controller having a device configured to detect a start of a communication between a predetermined first base station and a mobile station, a device configured to request a hand-over process to the mobile station, and a device configured to transfer a transmission signal to the mobile station to a base station controller of a hand-over destination, in which the first base station controller is connected to a first base station group including the predetermined first base station; and a second base station controller having a device configured to transmit the transmission signal transferred from the first base station controller, through a predetermined second base station to the mobile station, in which the second base station controller is connected to a second base station group including the predetermined second base station.

According to the fifth invention, it is possible to make the hand-over process of the radio mobile station between the radio base station controllers effective. That is, in the hand-over between the radio base station controllers, the first radio base station controller serving as a hand-over source, when detecting a start of a communication between the radio mobile station and the predetermined first radio base station, requests the hand-over process to the radio mobile station. Then, the side of the radio mobile station starts preparing the hand-over process. The first radio base station controller further transfers a signal to be transmitted through the predetermined first radio base station to the radio mobile station, to the second radio base station controller serving as a hand-over destination of the radio mobile station. The second base station controller transmits the transferred signal to the radio mobile station. Thus, the same signal is transmitted to the radio mobile station from both the first and second radio base station controllers. The radio mobile station compares the reception states of the two signals, and stops receiving the signal from the first radio base station controller, when the reception state of the signal from the second radio base station controller becomes superior in conjunction with the movement, and then ends the hand-over process. Hence, it is possible to smoothly switch the communication from the first radio base station controller of the radio mobile station to the second radio base station controller. Hence, it is possible to make the control of the hand-over process easier.

The sixth feature of the present invention lies in a radio communication method at least comprising the steps of: detecting a start of a communication between a predetermined first base station connected to a first base station controller and a mobile station running on a road; requesting a hand-over process to the mobile station; transferring to a second base station controller, a signal to be transferred through the predetermined first base station to the mobile station; transmitting the signal to the mobile station through a predetermined second base station connected to the second base station controller; and selecting a signal in which a reception state is superior, from two signals received by the mobile station.

This sixth invention is a radio communication method attained by the radio communication system described in the fifth feature. So, it has the same effect as the fifth feature.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE INVENTION

Figure 1:
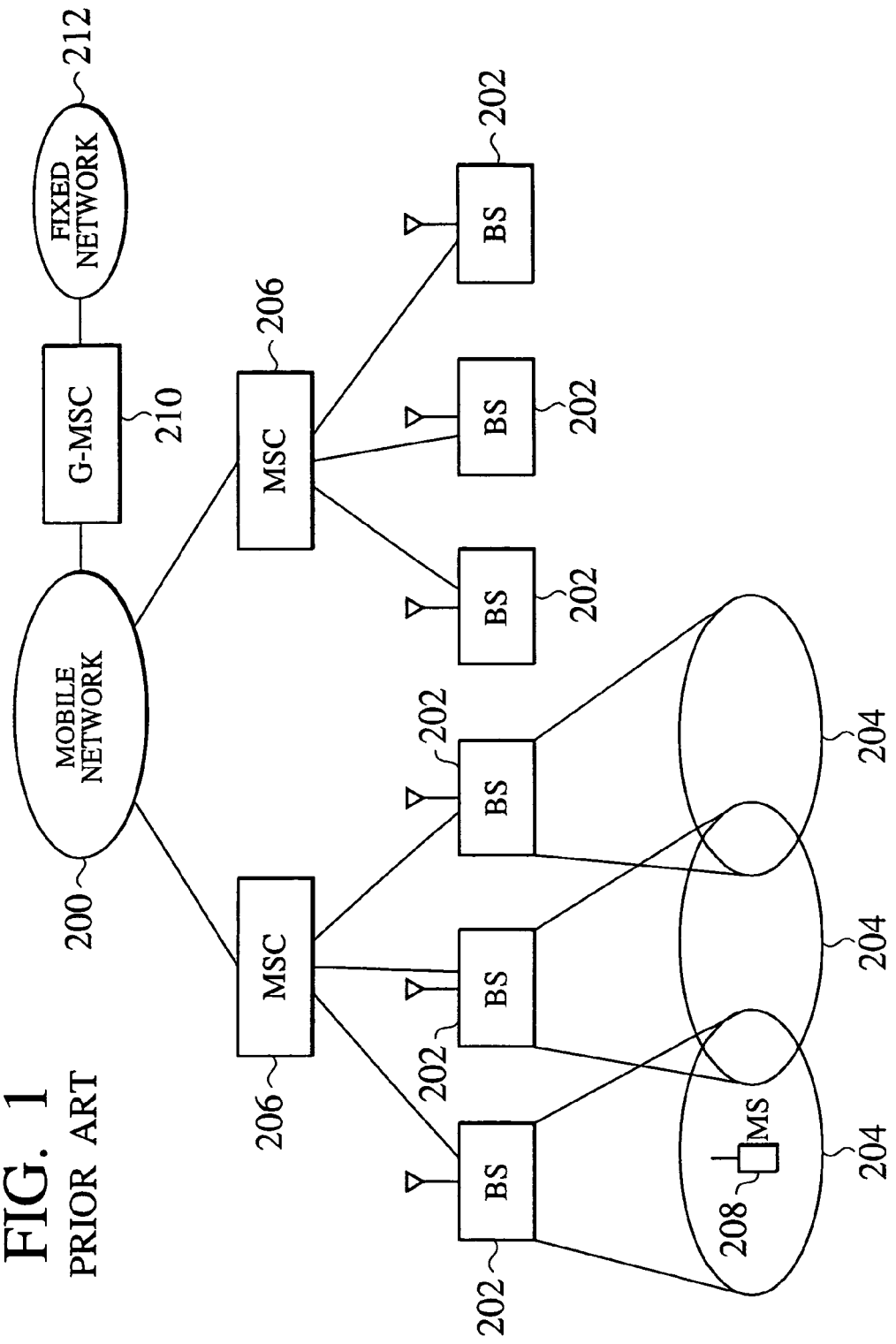
FIG. 1 is a view showing an example of a conventional radio communication system in which a plurality of base stations are connected to a mobile services switching center.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

Figure 2:
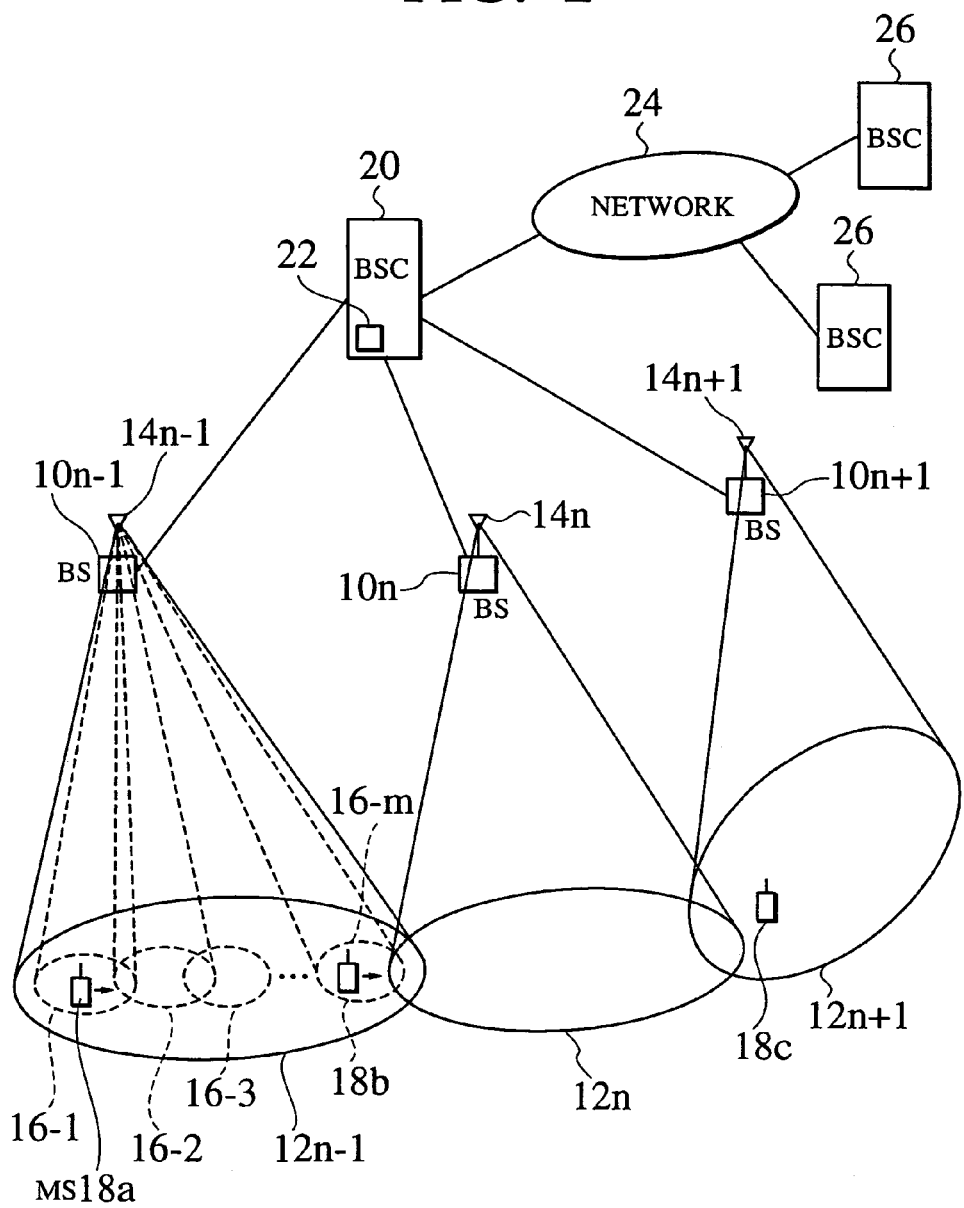
FIG. 2 is a view showing a configuration of a radio communication system according to a first embodiment of the present invention.

FIG. 2 is a view showing a configuration of a radio communication system according to a first embodiment of the present invention. In the radio communication system according to the first embodiment of the present invention, a plurality of areas (cells) covered by each base station constitute an entire service area of a mobile communication network. In FIG. 2, the explanation is done under the assumption that the number of base stations managed by one base station controller is 3, for the purpose of simple explanation.

In the radio communication system according to the first embodiment of the present invention in FIG. 2, areas (hereafter, referred to as base station areas) $12n-1$, $12n$ and $12n+1$ managed by radio base stations $10n-1$, $10n$ and $10n+1$ divide parts of an service area and covers them. The respective radio base stations $10n-1$, $10n$ and $10n+1$ have antennas $14n-1$, $14n$ and $14n+1$, respectively, which can generate a plurality of beam patterns. Each of the respective base station areas $12n-1$, $12n$, $12n+1$ is provided with a plurality of areas (hereafter, referred to as beam areas) 16-1, 16-2 to 16-$m$ generated by their antennas $14n-1$, $14n$ and $14n+1$. Each of the radio base stations $10n-1$, $10n$ and $10n+1$ carries out a radio communication with a radio mobile station 18 (18$a$, 18$b$ and 18$c$) within each of the base station areas $12n-1$, $12n$, $12n+1$ through each of the antennas $14n-1$, $14n$ and $14n+1$.

Similarly to the radio communication system of FIG. 1, the radio base stations $10n-1$, $10n$ and $10n+1$ are managed by one radio base station controller 20. However, the present invention is different from the conventional configuration of FIG. 1 in that the respective radio base stations $10n-1$, $10n$ and $10n+1$ do not have a demodulator for demodulating a signal received from the radio mobile station 18 and a modulator for modulating a signal sent to the radio mobile station 18. In short, the radio communication system according to the first embodiment of the present invention in FIG. 2 does not carry out a demodulation at a time of a reception and a modulation at a time of a transmission, namely, it does not carry out the modulation/demodulation. It only transmits a modulated reception signal to the radio base station controller 20 and only transmits a signal modulated by the radio base station controller 20 to the radio mobile station 18. Moreover, the present invention has a feature that this modulation/demodulation is carried out by the radio base station controller 20 managing the radio base stations $10n-1$, $10n$ and $10n+1$.

That is, in the first embodiment of the present invention, in a case of the receiving system (from the radio mobile station 18 to the radio base stations $10n-1$, $10n$ and $10n+1$), each of the radio base stations $10n-1$, $10n$ and $10n+1$, when receiving a modulated signal from the radio mobile station 18 within each of the base station areas $12n-1$, $12n$, $12n+1$, transmits the signal to the radio base station controller 20 in its original state. Then, the radio base station controller 20 having a modulator/demodulator 22 demodulates the modulated signal. On the other hand, in a case of the transmitting system (from the radio base stations $10n-1$, $10n$ and $10n+1$ to the radio mobile station 18), the modulator/demodulator 22 of the radio base station controller 20 modulates a signal in advance. Then, the radio base station controller 20 transmits the modulated signal through the radio base stations $10n-1$, $10n$ and $10n+1$ to the radio mobile station 18.

Usually, the radio base station controller 20, and the radio base stations $10n-1$, $10n$ and $10n+1$ are connected through wire lines to each other. As its connection, there is an RoF (Radio on Fiber) transmission in which a radio signal is transmitted, for example, through an optical cable. Not only various information signals but also a control signal through which the radio base station controller 20 controls the radio base stations $10n-1$, $10n$ and $10n+1$ are transmitted between the radio base station controller 20 and the radio base stations $10n-1$, $10n$ and $10n+1$. Moreover, the radio base station controller 20 is connected through a network 24 to other radio base station controllers 26. By the way, a plurality of radio base stations (not shown) are also connected to the other radio base station controllers 26 although this is natural.

Figure 3:
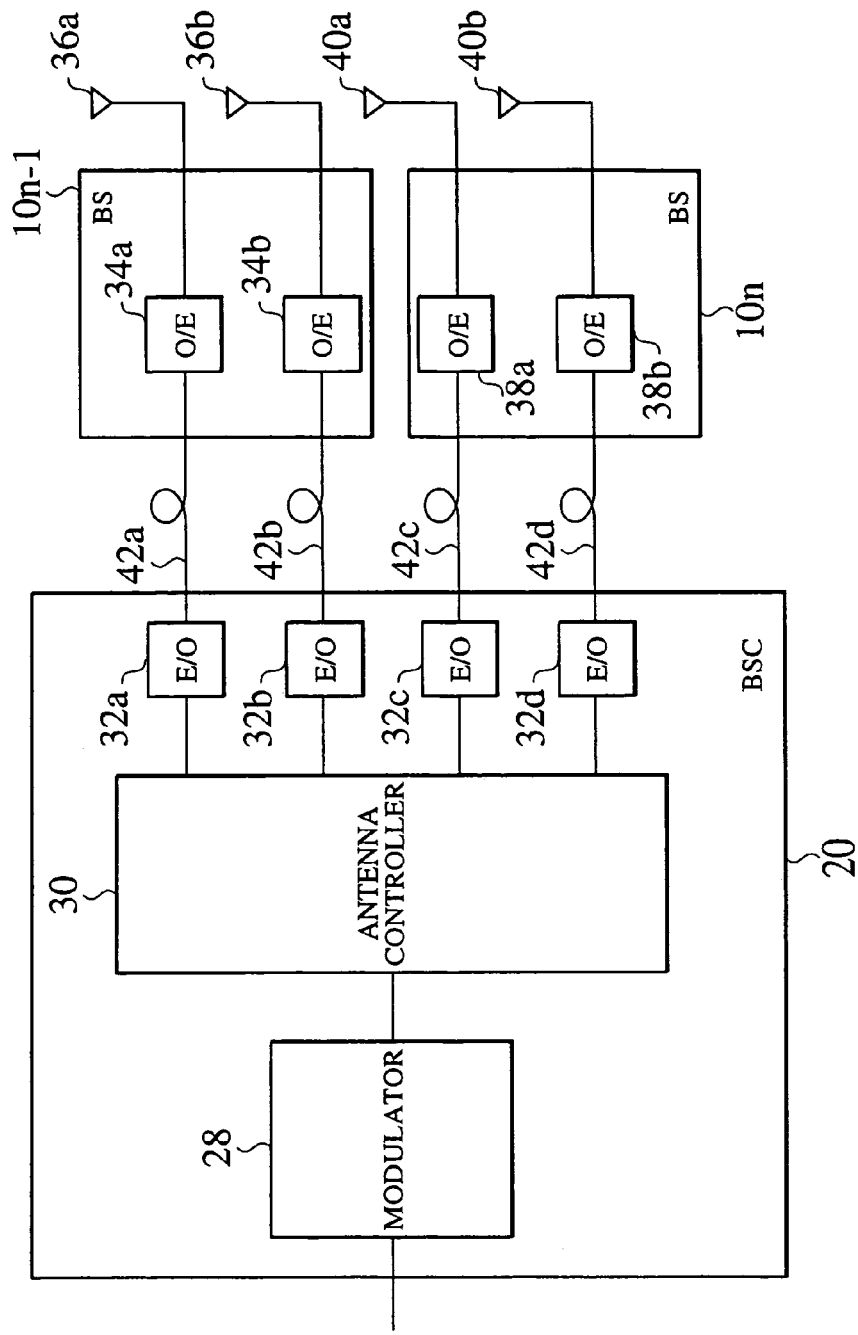
FIG. 3 is a block diagram showing an actual configuration example of a radio base station controller 20 and radio base stations $10n-1$, $10n$ in FIG. 2, in a case of a transmitting system.

FIG. 3 is a block diagram showing the actual configuration example of the radio base station controller 20 and the radio base stations $10n-1$, $10n$ in FIG. 2. The example of FIG. 3 shows the case of the transmitting system (from the radio base stations $10n-1$, $10n$ to the radio mobile station 18). For the purpose of simple explanation, only the basic configuration is illustrated, and a frequency converter and the like are omitted. As shown in FIG. 3, the radio base station controller 20 is provided with: a modulator 28 for modulating a transmission signal; an antenna controller 30 for controlling the antennas $14n-1$, $14n$ of the radio base stations $10n-1$, $10n$; and an E/O converter 32 (32a, 32b, 32c and 32d) for converting the transmission signal modulated by the modulator 28 from an electric signal into an optical signal. In FIG. 3, one modulator 28 modulates a transmission signal to be transmitted to both the radio base stations $10n-1$, $10n$. However, the number of modulators 28 is not limited to it. For example, it may be designed to mount a dedicated modulator for each managed radio base station.

On the other hand, the radio base station $10n-1$ is composed of: an O/E converter 34 (34a, 34b) for converting the transmission signal sent by the radio base station controller 20 from an optical signal into an electric signal; and an antenna device 36 (36a, 36b) for emitting the transmission signal as an electric wave. Similarly, the radio base station $10n$ is composed of: an O/E converter 38 (38a, 38b) for again converting the transmission signal sent by the radio base station controller 20 from the optical signal into the electric signal; and an antenna device 40 (40a, 40b) for emitting the transmission signal as an electric wave. The antenna devices 36, 40 are parts of a plurality of antenna devices constituting the antennas $14n-1$, $14n$ of FIG. 2. Here, they correspond to the devices for transmission. Then, the radio base station controller 20 and the radio base stations $10n-1$, $10n$ are connected through an optical fiber 42 (42a, 42b, 42c and 42d) to each other.

The operations of the radio base station controller 20 and the radio base stations $10n-1$, $10n$ of FIG. 2 in the case of the transmitting system will be described below with reference to FIG. 3. At first, the modulator 28 of the radio base station controller 20 modulates a transmission signal, and outputs through the frequency converter (not shown), the antenna controller 30 and the like to the E/O converter 32. The E/O converter 32 converts the transmission signal into an optical frequency area, and sends through the respectively connected optical fiber 42 (42a, 42b, 42c and 42d) to the radio base stations $10n-1$, $10n$. Then, after the O/E converters 34, 38 again convert the sent transmission signals into the electric signals and then the amplifications are performed on them, the radio base stations $10n-1$, $10n$ uses the antenna devices 36, 40 to then emit as the electric wave.

Here, the antenna controller 30 within the radio base station controller 20 controls the antenna devices 36, 40 of the radio base stations $10n-1$, $10n$, as described below. That is, the antenna controller 30 has a function of optimizing the beam pattern to the radio mobile station 18 by selecting a weight optimal for the settings of the antenna devices 36, 40. As an actual control method, for example, there are settings of excitation amplifications and excitation phases of the antenna devices 36, 40. Then, the antenna controller 30 controls the antenna devices 36, 40 and scans a beam so that the beam is always directed to the moving radio mobile station 18.

For example, in FIG. 2, when the radio mobile station 18 moves from a position of a radio mobile station 18a through a position of a radio mobile station 18b to a position of a radio mobile station 18c, the antenna controller 30 carries out a control as described below. At first, while the radio mobile station 18 moves from the position of the radio mobile station 18a to the position of the radio mobile station 18b, it uses only the antenna device 36 of the radio base station $10n-1$. The beam area 16 is sequentially switched from the beam area 16-1 to the beam area 16-$m$ in conjunction with the movement of the radio mobile station 18 so that the beam is always directed to the radio mobile station 18.

When the radio mobile station 18 tries to go from the position of the radio mobile station 18b into the base station area $12n$ of the radio base station $10n$, the antenna controller 30 switches the control target from the antenna device 36 of the radio base station $10n-1$ to the antenna device 40 of the radio base station $10n$. Then, similarly to the above-mentioned case, it controls the antenna device 40 and generates a beam pattern suitable for the radio mobile station 18. Moreover, when the radio mobile station 18 moves to the position of the radio mobile station 18c and goes into the base station area $12n+1$ of the radio base station $10n+1$, the antenna controller 30 switches the control target from the antenna device 40 of the radio base station $10n$ to an antenna device (not shown) of the radio base station $10n+1$, and carries out the similar control. In this way, the antenna controller 30 controls the antenna devices 36, 40 of the respective radio base stations $10n-1$, $10n$ and $10n+1$ and the like. Thus, the respective radio base stations $10n-1$, $10n$ and $10n+1$ can generate the beam pattern always suitable for the moving radio mobile station 18. Hence, it is possible to carry out the excellent radio communication with the radio mobile station 18.

Figure 4:
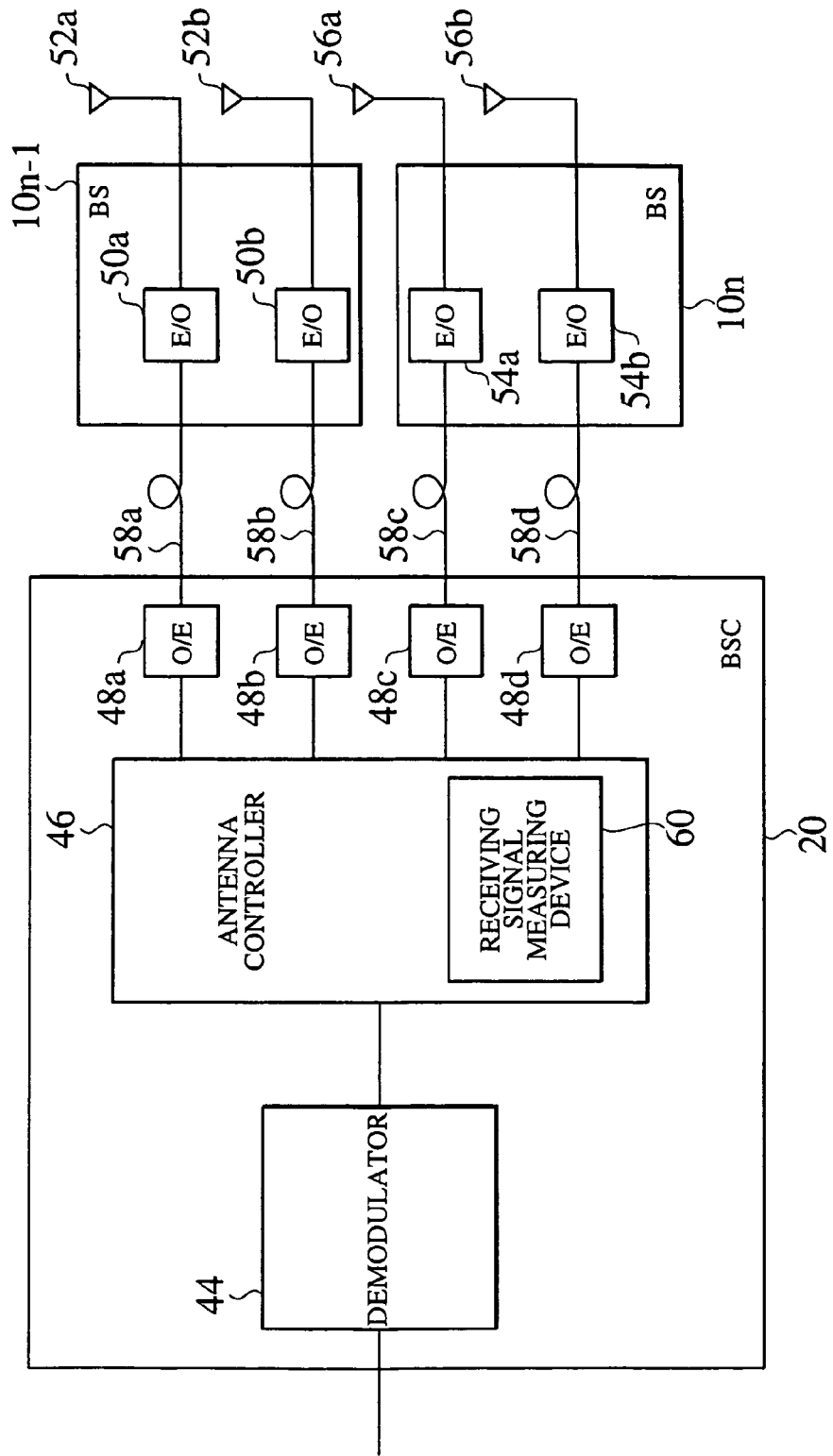
FIG. 4 is a block diagram showing an actual configuration example of a radio base station controller 20 and radio base stations $10n-1$, $10n$ in FIG. 2, in a case of a receiving system.

FIG. 4 is a block diagram showing the actual configuration example of the radio base station controller 20 and the radio base stations 10n−1, 10n of FIG. 2, in the case of the receiving system (from the radio mobile station 18 to the radio base stations 10n−1, 10n). Also, in the case of the receiving system, the similar function can be attained under the configuration similar to that of the transmitting system shown in FIG. 3. However, the flow of the signal is opposite. So, in the receiving system of FIG. 4, the modulator 28 within the radio base station controller 20 of the transmission system shown in FIG. 3 is substituted for a demodulator 44, the E/O converter 32 is substituted for an O/E converter 48, and the antenna controller 30 is substituted for an antenna controller 46 having a configuration different from that of the antenna controller 30, respectively. Moreover, the O/E converters 34, 38 within the radio base stations 10n−1, 10n are substituted for E/O converters 50, 54.

The antenna controller 46 within the radio base station controller 20 of FIG. 4 has a receiving signal measuring device 60 for measuring a reception strength, a signal wave form and the like of a signal received by each of receptions antenna devices 52, 56 of the radio base stations 10n-1, 10n. The antenna controller 46 can optimize a beam pattern generated by the antenna device, in accordance with the result measured by the measuring device 60. For example, it is possible to select only the antenna devices 52, 56 having the strong reception strengths from the result measured by the measuring device 60 to thereby receive only the strongest signal and not to receive the unnecessary electric waves (interference signals). Also, by weighting the respective antenna devices 52, 56, a null point (zero point) of the beam pattern may be defined in a direction in which an interference signal to be removed is inputted. This is because the reception of the interference wave can be removed by directing the null point to the direction of the interference wave. Or, the antenna devices 52, 56 may be driven so that a beam having a maximum gain is directed to a direction of a desirable signal.

In the first embodiment of the present invention, the number of radio base stations 10n−1, 10n and 10n+1 connected to the radio base station controller 20, the number of antenna devices mounted in the respective radio base stations 10n−1, 10n and 10n+1 and the like are not limited to the configurations shown in FIGS. 2 to 4. Also, the transmitting system and the receiving system are separately described. However, it may be naturally designed that the radio base station controller 20 and the radio base stations 10n−1, 10n and 10n+1 have the configurations of both the transmitting system and the receiving system. In this case, the usage of a branching filter, a circulator, a switch and the like enables the antenna devices 36, 40, 52 and 56 in the respective radio base stations to be shared in the transmitting system and the receiving system. Moreover, the combination of the modulator 28 and the demodulator 44 may be used as one modulator/demodulator.

The first embodiment of the present invention especially targets an inter-lane communication in a high rode traffic system (hereafter, abbreviated as ITS) in a so-called mobile communication system. Here, the feature of the inter-lane communication is described. A car (radio mobile station), since usually running on a road, receives some limitation on a moving direction of the car. In a case of an expressway, the car runs on only a straight line, and does not turn right or left, except an interchange, a service area and the like. Thus, the radio base stations targeting the ITS are arranged in a line along the road. This fact can be regarded as the situation that hand-over destinations of the respective radio base stations are limited, from the viewpoint of the hand-over technique in the radio communication. For example, in FIG. 2, let us suppose that the radio mobile station 18 goes from the position of the radio mobile station 18a through the position of the radio mobile station 18b into the position of the radio mobile station 18c. In short, the radio mobile station 18 moves in the passage order of the base station areas 12n−1, 12n and 12n+1. As mentioned above, in the base station area 12n−1, the scanning operation is carried out in the order of the beam areas 16-1, 16-2, 16-3 to 16-m. When the present invention is applied to the radio system in which such beam areas 16 are connected in series (in a line), the hand-over destinations are limited as mentioned above. Hence, it is possible to largely simplify the control of the hand-over. Thus, this has a merit of providing a radio communication system having a high reliability.

The operation of the first embodiment of the present invention applied to the ITS will be described below with reference to FIG. 2. In the first embodiment of the present invention, the radio base station controller 20 assigns one particular radio channel, for example, to a radio mobile station 18 (in this case, a car) within the base station area 12n−1 of the radio base station 10n−1. This radio channel can be used by only the radio mobile station 18 while it stays within the base station area 12n−1. Typically, as a method for attaining a multiple access, there are a time division multiple access (TDMA), a frequency division multiple access (FDMA) and a code division multiple access (CDMA). For example, in a case of the TDMA, the radio channel corresponds to a time slot. In a case of the FDMA, it corresponds to a frequency band. And, in a case of the CDMA, it corresponds to a PN (Pseudo Noise) code (diffusion code).

The radio mobile station 18 uses the assigned radio channel and sends a signal. Of course, it is the radio base station 10n−1 that receives the sent signal. However, the radio base station receiving the signal is not always limited to only the radio base station 10n−1. For example, even the radio base station 10n adjacent to the radio base station 10n−1 can receive it.

Tentatively let us suppose that an information signal from: the radio mobile station 18 within the base station area 12n−1 of the radio base station 10n−1 is received by both the radio base stations 10n−1, 10n. In this case, the same two signals received by the respective radio base stations 10n−1, 10n are sent to the radio base station controller 20. Then, the radio base station controller 20 can determine a base station area in which the radio mobile station 18 is present. The determination of the base station area is carried out, for example, in the following procedure.

(a) Measure received signal strength indicators (RSSIs) of the two signals.

(b) Compare the strengths of the two measured RSSIs.

(c) Determine that the radio mobile station 18 is present in a base station area of a radio base station having the strongest RSSI, from the compared result.

The radio base station controller 20, when there is an information to be sent to the radio mobile station 18, may send the signal through a radio base station (for example, the radio base station 10n−1) determined as the radio base station in which the radio mobile station 18 is present. The radio base station controller 20 carries out the determination each time the signal is sent from the radio mobile station 18. Until it is determined that the radio mobile station 18 is present in a base station area 12n of a different radio base station (for example, the radio base station 10n), the radio base station controller 20 continues to send the signal through the radio base station 10n−1.

The radio base station controller 20 can select a beam pattern optimal for a radio base station at a time of a reception, on the basis of the signal sent by the radio mobile station 18.

(1) For example, in a case of the configuration shown in FIG. 4, the receiving signal measuring device 60 within the antenna controller 46 can measure the reception strengths, the signal wave forms and the like of the radio base stations 10n–1, 10n. If the reception strengths of the respective antenna devices 52, 56 are monitored to accordingly select the antenna devices 52, 56 having the strongest reception strength, it is possible to select the beam pattern optimal for the radio base station. Also, (2) an adaptive array for setting an optimal weight based on a reception signal of each antenna device may be configured to accordingly select an optimal beam pattern. Directing the beam to the radio mobile station 18 or suppressing the interference wave enables the desirable beam pattern to be selected. Or, (3) a position of the radio mobile station 18 is recognized by using an external sensor or the like, and an optimal beam is directed to the radio mobile station 18. Accordingly, an optimal beam pattern may be selected.

The radio base station controller 20 correlates the reception beam pattern selected by using the above-mentioned method to an identification information of the targeted radio mobile station 18, and generates a beam pattern information, and then stores it in a predetermined memory. When the signal is sent to the radio mobile station 18, the optimal transmission beam pattern can be generated by referring to the beam pattern information of the radio mobile station 18. By the way, when the transmitting method between the radio base station controller 20 and the radio mobile station 18 is a TDD (Time Division Duplex) method and further a fixed slot assignment is carried out, the beam pattern used in the reception slot can be used in its original state as the transmission beam pattern. Thus, in this case, the radio base station controller 20 does not need to hold the beam pattern information.

Figure 5:
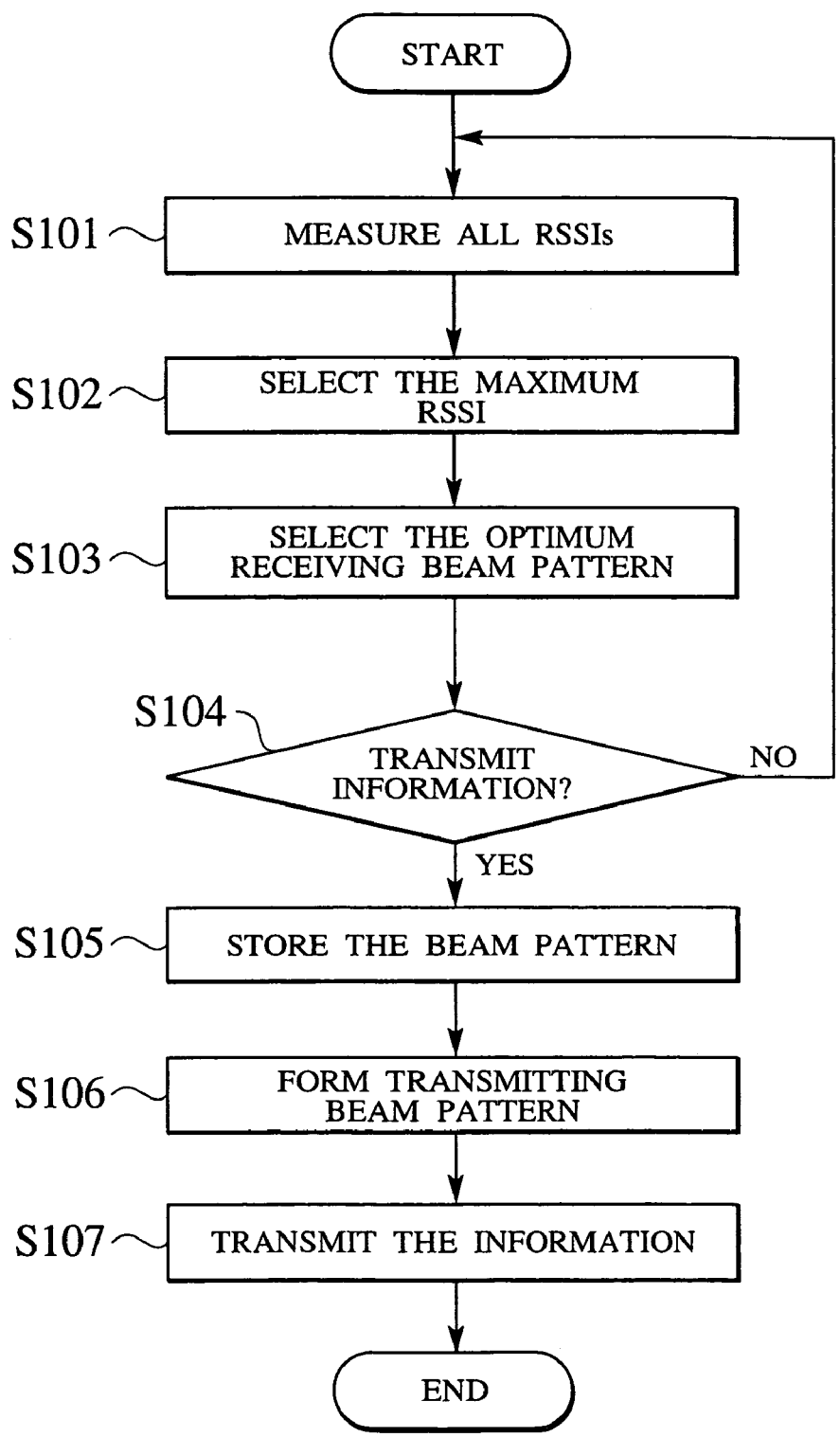
FIG. 5 is a flowchart showing a procedure when an optimal beam pattern at a time of a transmission is generated.

As mentioned above, in the first embodiment of the present invention, the radio base station in which the radio mobile station 18 is present is determined in accordance with the signal from the radio mobile station 18. Thus, in this embodiment, it is enough to select an optimal reception beam pattern only for the radio base station in which the radio mobile station 18 is present. The radio base station controller 20 generates the transmission beam pattern optimal for the corresponding radio base station at a time of a transmission, and attains a radio communication having a high reliability. Its procedure is carried out, for example, in the following procedure. FIG. 5 is a flowchart showing the process when an optimal beam pattern is generated at a time of a transmission.

As shown in FIG. 5, the radio base station controller 20 firstly measures the RSSIs of all radio base stations receiving a transmission signal from the radio mobile station 18 (Step S101). Next, the radio base station controller 20 selects the maximum of the measured RSSIs. In short, it determines a radio base station in which the radio mobile station 18 is present (Step S102). It selects an optimal reception beam pattern of the radio base station having the selected maximum RSSI (Step S103). If there is no information to be sent to the radio mobile station 18 (Step S104 NO), the operational flow again returns back to the step S101. It measures the RSSIs of all the radio base stations receiving the transmission signal from the radio mobile station 18.

On the other hand, if there is the information to be sent to the radio mobile station 18 (Step S104 YES), it holds the optimal reception beam pattern selected at the step S103 and the identification information of the targeted radio mobile station 18 as the beam pattern information (Step S105). In accordance with the beam pattern information held at the step S105, a transmission beam pattern to be currently sent to the radio mobile station 18 is generated by its radio base station (Step S106). After that, it sends the information signal to the radio mobile station 18 (Step S107).

Figure 6:
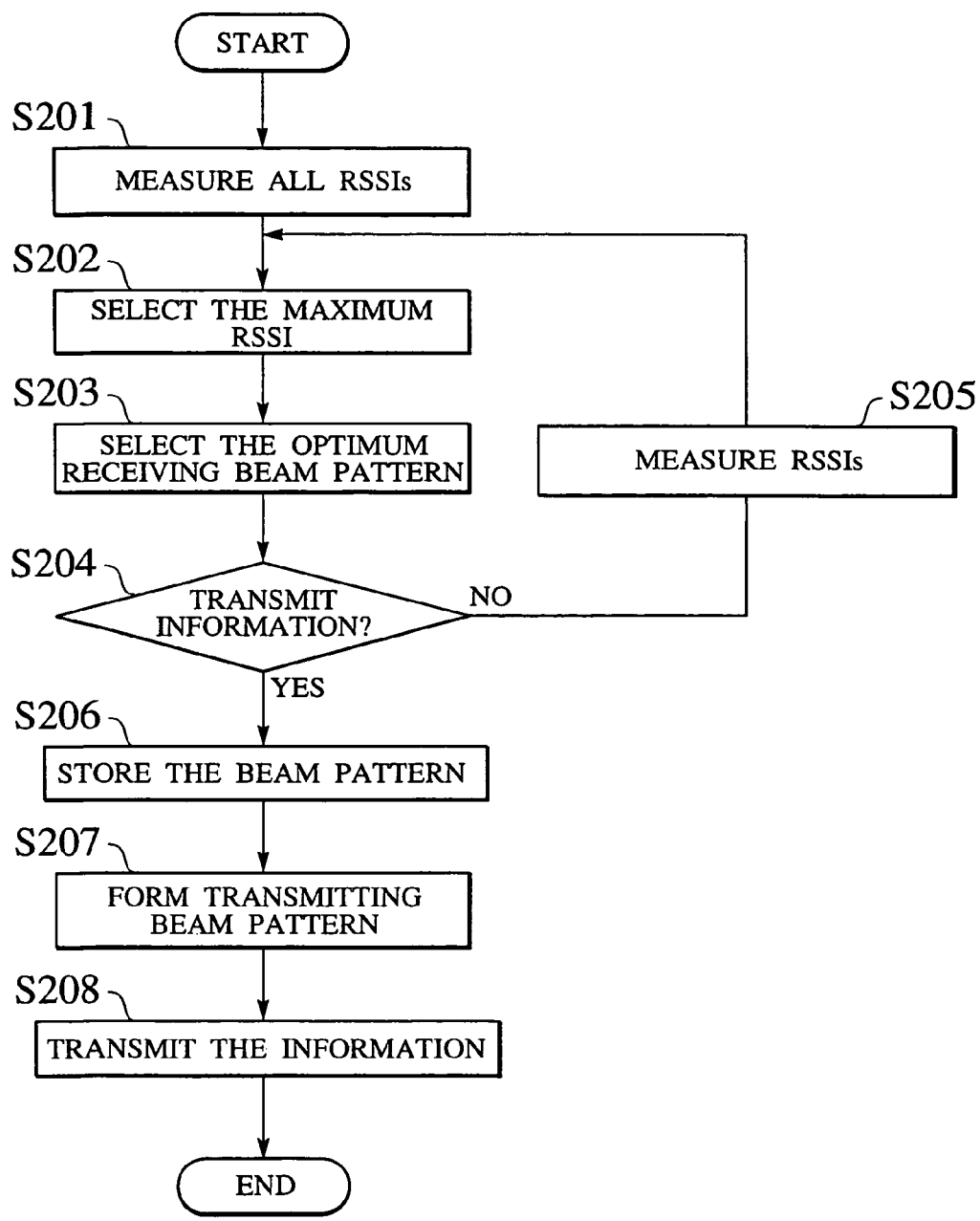
FIG. 6 is a flowchart showing another procedure when an optimal beam pattern at a time of a transmission is generated

As mentioned above, the first embodiment of the present invention targets the ITS inter-lane communication. The movement destination (hand-over destination) of the radio mobile station 18 is limited, in this ITS inter-lane communication. Actually, as shown in the procedure of FIG. 5, it is not necessary to measure the RSSIs of all the radio base stations receiving the transmission signal from the radio mobile station 18 (Step S101 of FIG. 5). In short, it is possible to predict the movement destination of the radio mobile station 18. Thus, after the maximum RSSI is once selected and the position of the radio mobile station 18 is pointed out, it is enough that the radio base station in which the radio mobile station 18 is currently present and the radio base station (the adjacent radio base station) corresponding to the movement destination is only targeted for the RSSI measurement. FIG. 6 is a flowchart showing a procedure in this case.

As shown in FIG. 6, the radio base station controller 20 firstly measures the RSSIs of all radio base stations receiving a transmission signal from the radio mobile station 18 (Step S201). Next, the radio base station controller 20 selects the maximum of the measured RSSIs, and determines a radio base station in which the radio mobile station 18 is present (Step S202). It selects an optimal reception beam pattern of the radio base station having the selected maximum RSSI (Step S203). If there is no information to be sent to the radio mobile station 18 (Step S204 NO), at this time, it measures the RSSI of the transmission signal of the radio mobile station 18, for the radio base station pointed out at the step S202 and the radio base station adjacent to it (Step S205). Then, the operational flow returns back to the step S202.

On the other hand, if there is the information to be sent to the radio mobile station 18 (Step S204 YES), it holds the optimal reception beam pattern selected at the step S203 and the identification information of the targeted radio mobile station 18 as the beam pattern information (Step S206). In accordance with the beam pattern information held at the step S206, a transmission beam pattern to the radio mobile station 18 is generated by its radio base station, at this time (Step S207). After that, it sends the information signal to the radio mobile station 18 (Step S208). This case can relax the treatment load on the radio base station controller 20 to accordingly reduce the entire treatment time.

Figure 7:
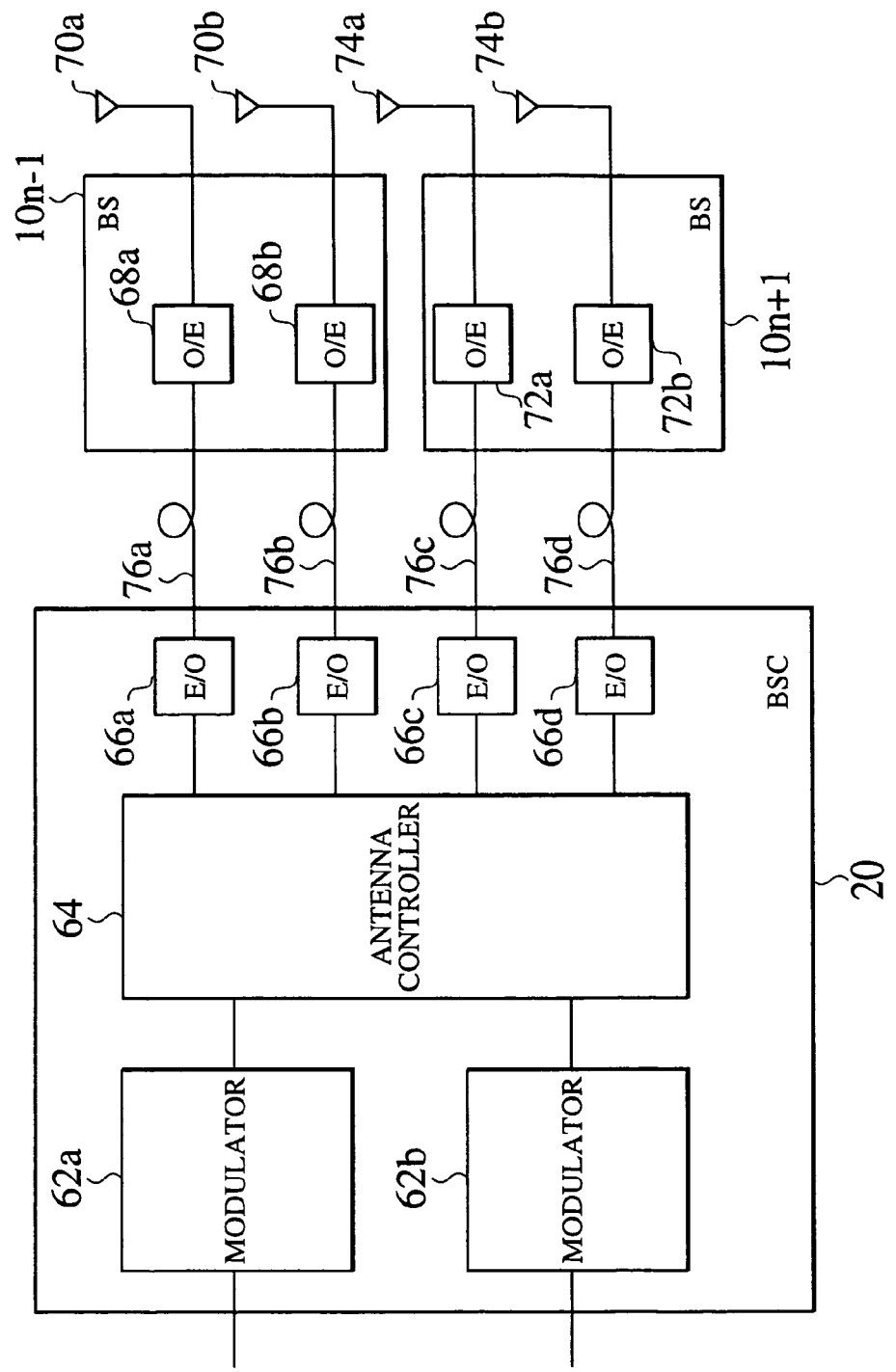
FIG. 7 is a block diagram showing an actual configuration example of a radio base station controller 20 and radio base stations $10n-1$, $10n+1$ in FIG. 2, in a case of a transmitting system.

In the first embodiment of the present invention, the same radio channel is assigned to a plurality of radio mobile stations within the area of the same radio base station, in order to effectively use a frequency. For this reason, it is necessary that the information which are sent and received between the respective radio base stations do not interfere with each other. The case that the same radio channel is assigned to the radio mobile station 18a existing in the base station area 12n–1 of the radio base station 10n–1 and the radio mobile station 18c existing in the base station area 12n+1 of the radio base station 10n+1 will be described below with reference to FIG. 2. FIG. 7 is a block diagram showing the actual configuration example of the radio base station controller 20 and the radio base stations 10n–1, 10n+1 of FIG. 2, in the above case. FIG. 7 shows the case of the transmitting system, similarly to FIG. 3. For the purpose of simple illustration, only the basic configuration is illustrated, and the frequency converter and the like are omitted.

As shown in FIG. 7, the radio base station controller 20 is provided with: a modulator 62 (62a, 62b) for modulating a signal; an antenna controller 64 for controlling the antennas 14n–1, 14n+1 of the radio base stations 10n–1, 10n+1; and an E/O converter 66 (66a, 66b, 66c and 66d) for converting the signal modulated by the modulator 62 from an electric signal into an optical signal. Here, the modulators 62*a*, 62*b* are operated at the same radio channel in a case of a frequency share (if the same frequency is used).

On the other hand, the radio base station 10*n*−1 is composed of: an O/E converter 68 (68*a*, 68*b*) for again converting the transmission signal sent by the radio base station controller 20 from an optical signal into an electrical signal; and an antenna device 70 (70*a*, 70*b*) for emitting the transmission signal as an electric wave. The radio base station 10*n*+1 is composed of: an O/E converter 72 (72*a*, 72*b*) for again converting the transmission signal sent by the radio base station controller 20 from the optical signal into the electric signal; and an antenna device 74 (74*a*, 74*b*) for emitting the transmission signal as an electric wave. The antenna devices 70, 74 are parts of a plurality of antenna devices constituting the antennas 14*n*−1, 14*n*+1 of FIG. 2. Here, they correspond to the devices for transmission. Then, the radio base station controller 20 and the radio base stations 10*n*−1, 10*n*+1 are connected through an optical fiber 76 (76*a*, 76*b*, 76*c* and 76*d*) to each other.

The operations of the radio base station controller 20 and the radio base stations 10*n*−1, 10*n*+1 of FIG. 2 will be described below with reference to FIG. 7. The modulator 62 modulates a transmission signal and outputs to the antenna controller 64. The antenna controller 64 selects the antenna devices 70, 74 to be used for a transmission of the transmission signal. Moreover, it sets the predetermined weights for the transmission signals corresponding to the selected antenna devices 70, 74. This weighting prevents a beam pattern generated by the antenna device 70 and a beam pattern generated by the antenna device 74 from interfering with each other.

For example, the antenna device 70 of the radio base station 10*n*−1 is selected for a transmission signal from the modulator 62*a*, and a predetermined weight is set for the transmission signal. The transmission signal weighted by the antenna controller 64 is emitted through the E/O converters 66*a*, 66*b*, the optical fibers 76*a*, 76*b* and the O/E converter 68 from the antenna device 70. Similarly, the antenna device 74 of the radio base station 10*n*+1 is selected for a transmission signal from the modulator 62*b*, and a transmission signal for which a predetermined weight is set is emitted from the antenna device 74. The weightings of the respective antenna devices 70, 74 prevent the beam pattern of the antenna device 70 and the beam pattern of the antenna device 74 from interfering with each other. For this reason, even if the same radio channel is shared between the radio base stations 10*n*−1 10*n*+1, this sharing has no influence on the communication line.

Figure 8:
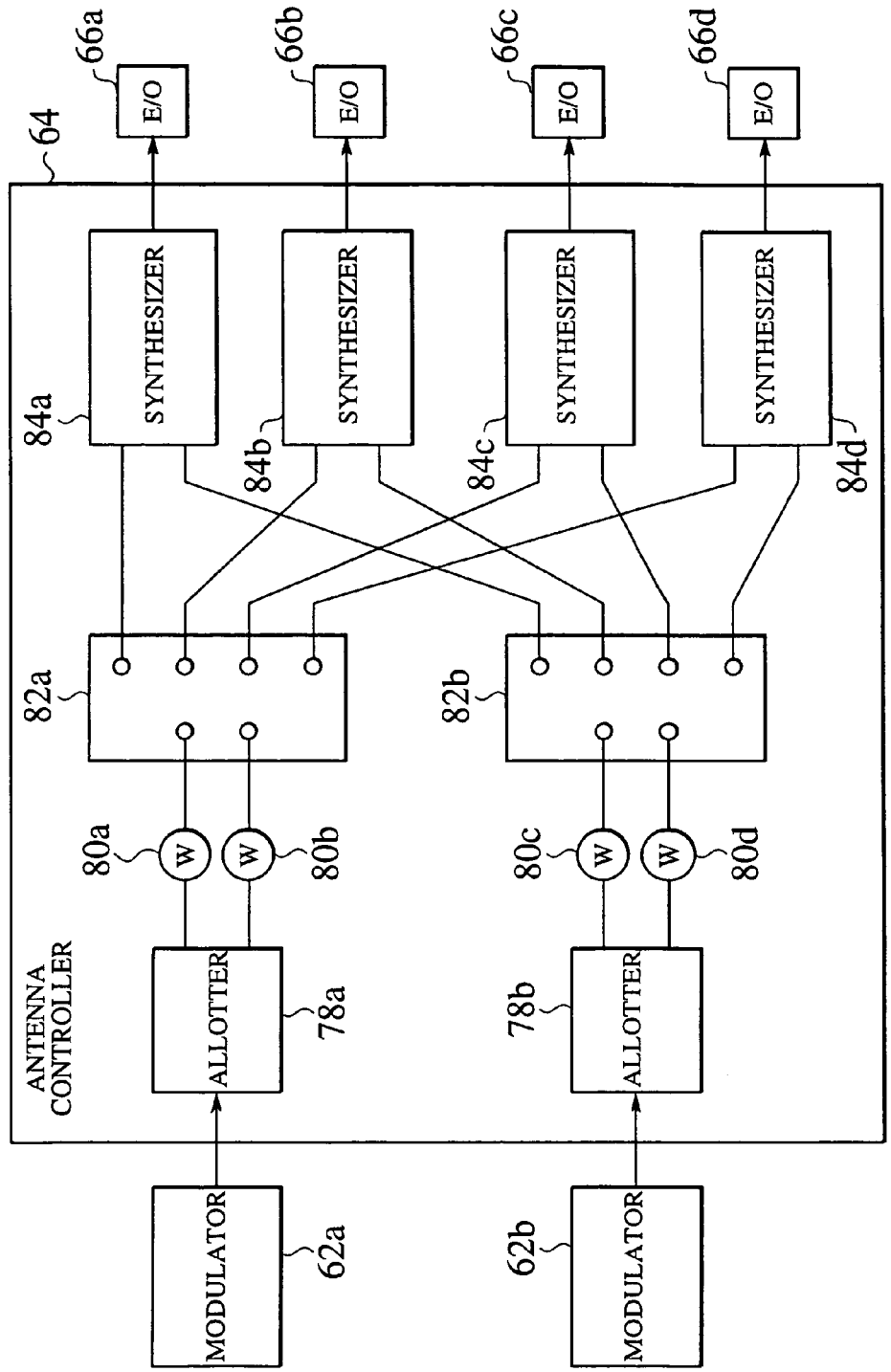
FIG. 8 is a block diagram showing an actual configuration of an antenna controller 64 of FIG. 7.

FIG. 8 is a block diagram showing the actual configuration of the antenna controller 64 of FIG. 7. As shown in FIG. 8, the antenna controller 64 is composed of an allotter 78 (78*a*, 78*b*) for distributing the transmission signal from the modulator 62, a weighting device 80 (80*a*, 80*b*, 80*c* and 80*d*) for setting a predetermined weight for the transmission signal, a matrix switch 82 (82*a*, 82*b*) for selecting the antenna devices 70, 74 used for transmission, and a synthesizer 84 (84*a*, 84*b*, 84*c* and 84*d*) for synthesizing the distributed transmission signals. The allotter 78 firstly distributes the transmission signal from the modulator 62, by a number corresponding to the number of antenna devices used by the respective radio base stations 10*n*−1, 10*n*+1 in the transmission. Here, each of the radio base stations 10*n*−1, 10*n*+1 has two antenna devices 70, 74. Thus, the same two transmission signals are generated. The predetermined weight is set for the distributed transmission signals by each weighting device 80. The weighted transmission signal is outputted to the matrix switch 82. The matrix switch 82 has a plurality of output ports corresponding to the respective antenna devices 70, 74, and selects the antenna devices 70, 74 used for the transmission, and then outputs the transmission signal to the synthesizer 84 corresponding to each of the antenna devices 70, 74. The synthesizer 84 synthesizes the signals from both the matrix switches 82*a*, 82*b*. Then, an output signal of the synthesizer 84 is outputted to the respectively corresponding antenna devices 70, 74. By the way, in FIG. 8, one of the antenna devices 70, 74 is shared in the transmission signals from the two modulators 62*a*, 62*b*. Thus, the synthesizer 84 is required. If one of the antenna devices 70, 74 is not shared in the transmission signals from the plurality of modulators 62, a switch may be used instead of the synthesizer.

Due to the above-mentioned configuration, the antenna controller 64 can select the predetermined antenna devices 70, 74 and set the predetermined weight for the selected antenna devices 70, 74. Thus, it is possible to prevent the beam pattern generated by the antenna device 70 and the beam pattern generated by the antenna device 74 from interfering with each other. So, the same radio channel can be used. That is, the same channel can be repeatedly used within the area covered by one radio base station controller 20. Hence, this is very effective from the viewpoint of the effective utilization of the limited frequency resource.

If the transmission signal is a digital signal in FIG. 7, most of the configuration of the antenna controller 64 can be attained by using a software, differently from the configuration of FIG. 8. For example, it can be attained by using DSP (Digital Signal Processor). In this case, the configuration and the control can be easily changed by re-writing the software. Thus, this has the merit that the flexibility with regard to a change or a version-up of the system is high. This case requires that the signal from the antenna controller 64 is converted from a digital signal to an analog signal by using a D/A converter or the like.

As mentioned above, if the same radio channel is assigned to a plurality of radio mobile stations within the area of the same radio base station controller, there may be a case that the radio base station controller receives a transmission signal from a different radio mobile station in the same channel. In this case, as a method for selecting one radio base station suitable for each radio mobile station, there are the following two methods:

(1) a method for selecting radio base stations suitable for each radio mobile station serving as a candidate in advance and selecting a radio base station having a maximum RSSI among them; and (2) a method for demodulating respective reception signals from the respective radio base stations, and using the information such as a destination address of its packet, a transmission source address and the like, and then judging whether or not they are the same packet.

In this method (2), if they are judged as the same packet, it is enough to select as the suitable radio base station, the radio base station having the maximum RSSI from the received radio base stations. Accordingly, while the radio mobile station moves within the same radio base station controller, it is possible to switch the radio base station without sending and receiving a message such as a hand-over request and the like. Also, the same radio channel is assigned to all the radio base stations managed by the radio base station controller. Thus, when the hand-over is carried out between those radio base stations, a disconnection of a call caused by a lack of a band at the hand-over destination and the like is never induced. Hence, a seamless communication can be done.

As mentioned above, according to the first embodiment of the present invention, the radio base station controller can carry out the hand-over control and the beam control between the radio base stations. Moreover, the hand-over destination between the radio base stations are uniquely determined. Thus, the hand-over between the radio base stations can be attained by using the easy control.

The first embodiment of the present invention is applied to a two-way communication. However, the present invention can be applied to, for example, a communication of only an up-link. In this case, the modulator and the like are not necessary since the radio base station controller has only a receiving device. Moreover, with regard to the channel assignment, only the channel for the up-link may be assigned.

Second Embodiment

A second embodiment of the present invention will be described below. In this second embodiment, a setting example of a radio channel in the first embodiment of the present invention is explained by using five examples.

(First Radio Channel Setting Example)

Figure 9A:
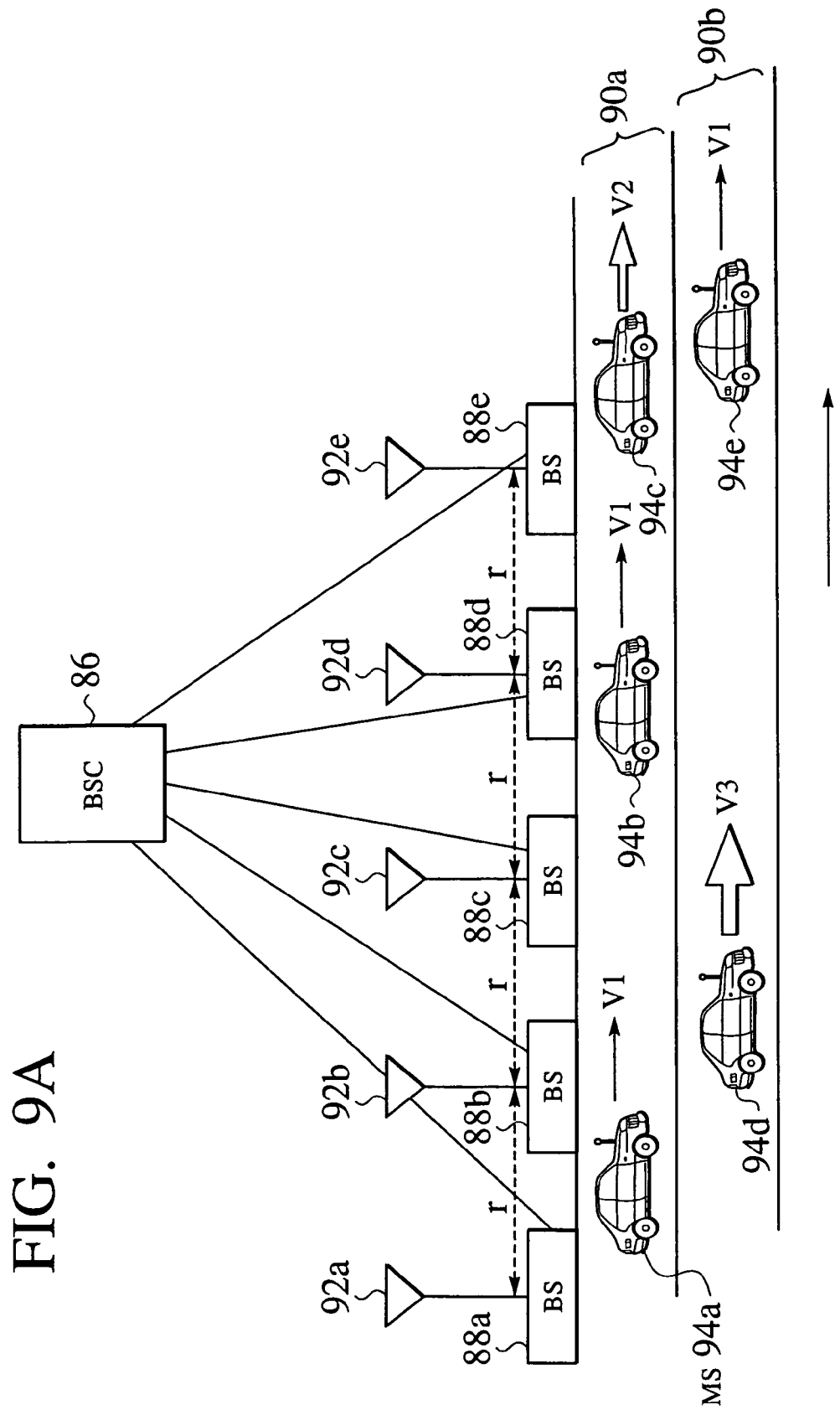
FIGS. 9A and 9B are views explaining a first radio channel setting example according to a second embodiment of the present invention.

FIG. 9 is a view explaining a first radio channel setting example according to the second embodiment of the present invention. In FIG. 9, the explanation is done under the assumption that the number of radio base stations managed by one radio base station controller is 5, for the purpose of simple explanation. Also, it is assumed that the number of radio channels which can be used within one base station controller is 3.

In a radio communication system shown in FIG. 9, a radio base station controller 86 manages five radio base stations 88 (88a, 88b, 88c, 88d and 88e) and carries out the respective controls. Those five radio base stations 88 are installed for each approximately "r" interval along a road 90 (90a, 90b). Each of the radio base stations 88 has an antenna 92 (92a, 92b, 92c, 92d and 92e). Then, the each radio base station 88 carry out a radio communication with a radio mobile station 94 (94a, 94b, 94c, 94d and 94e) within a base station area (not shown) constituted by a beam pattern of the antenna 92, by using a predetermined radio channel. Here, each antenna 92 is an antenna having one or more beam patterns or having a variable beam pattern shape. For example, it may be constituted by an array antenna composed of a plurality of antenna devices.

The first radio channel setting example is carried out by the following procedure.

(a) The radio base station controller 86 detects a speed of the radio mobile station 94 moving on the road 90, through each of the radio base stations 88. As a method for detecting this speed of the radio mobile station 94, there may be a method for detecting from a sensor (an electric wave sensor, an optical sensor and the like) of the radio base station 88, a method in which a mobile body itself installed in the radio mobile station 94 measures its speed by using a speed meter and then its measured result is reported to the radio base station 88, and the like.

(b) The speeds of the radio mobile stations 94 are grouped in accordance with the sensed speeds of the radio mobile stations 94. This grouping is done depending on the number of radio channels which the radio base station controller 86 can use. In FIG. 9, the radio mobile stations 94a, 94b and 94e move at a speed v1 (=80 km/h), the radio mobile station 94c moves at a speed v2 (=100 km/h) and the radio mobile station 94d moves at a speed v3 (=120 km/h) on the road 90 in the same direction. For this reason, the grouping is set, for example, such as a group 1 of the speed v1, a group 2 of the speed v2 and a group 3 of the speed v3.

Figure 9B:
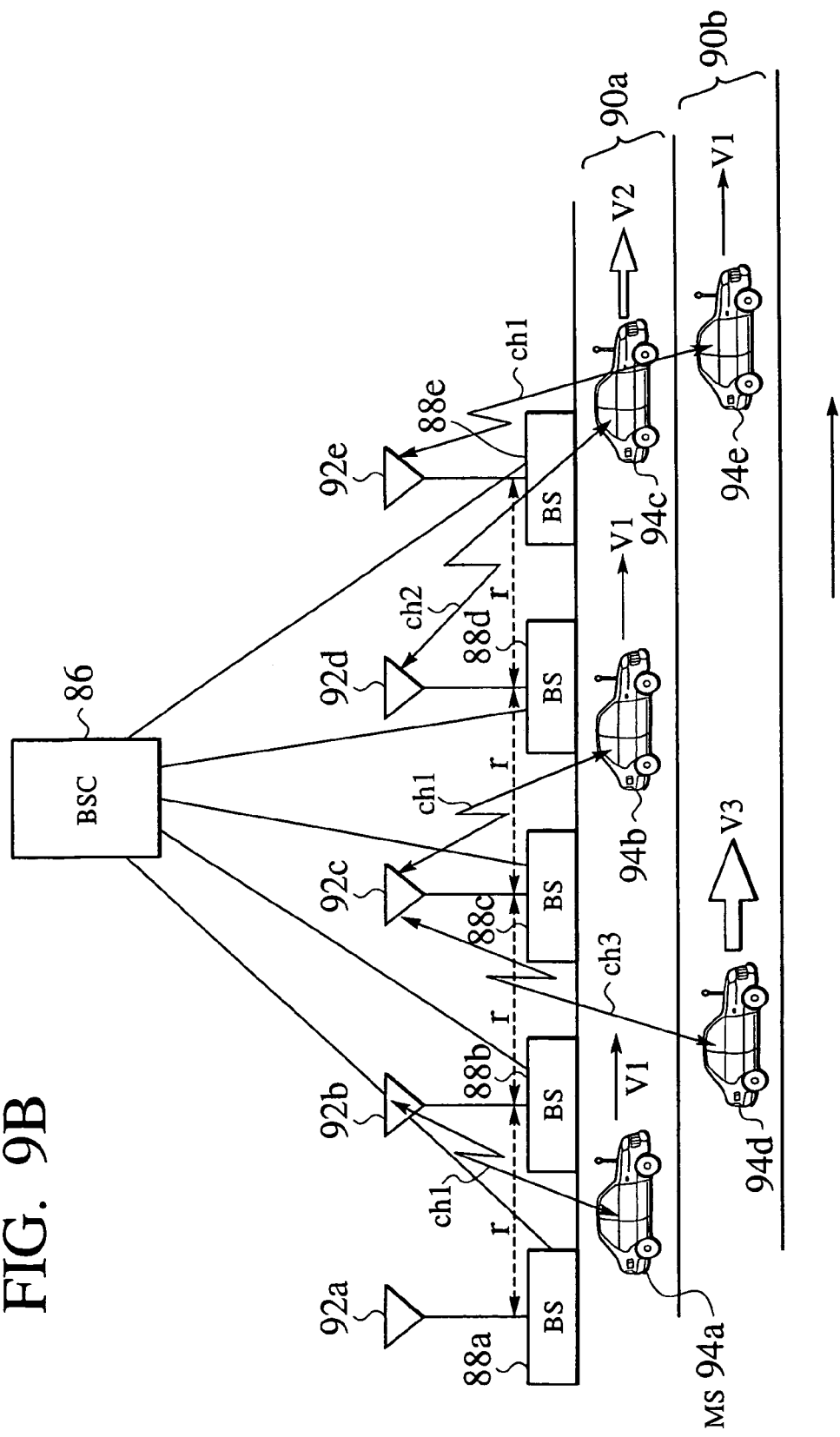

(c) The radio channel is assigned for each set group. FIG. 9B shows an example of the assignment. In FIG. 9B, a channel ch1 is assigned to the group 1 (the speed v1), a channel ch2 is assigned to the group 2 (the speed v2) and a channel ch3 is assigned to the group 3 (the speed v3), respectively.

In this first radio channel setting example, the grouping is done for each radio mobile station 94 having the same speed. A different radio channel is assigned to each group. Accordingly, this prevents the beam patterns using the same channel from intersecting with each other (interfering with each other). Actually, in FIG. 9A, a pass or a pursuit does not occur between the radio mobile stations 94a, 94b and 94e of the same speed (the same average speed). Thus, as shown in FIG. 9B, the same radio channel ch1 is assigned to those radio mobile stations 94a, 94b and 94e so as to avoid the interference in the same radio channel ch1. Hence, the radio channel ch1 can be repeatedly used.

That is, according to this first radio channel setting example, it is possible to improve the usage efficiency of the frequency and thereby reserve a larger number of radio channels. Also, this is effective for a Platoon run that is a car group run in which a distance between the cars is short.

(Second Radio Channel Setting Example)

Figure 10A:
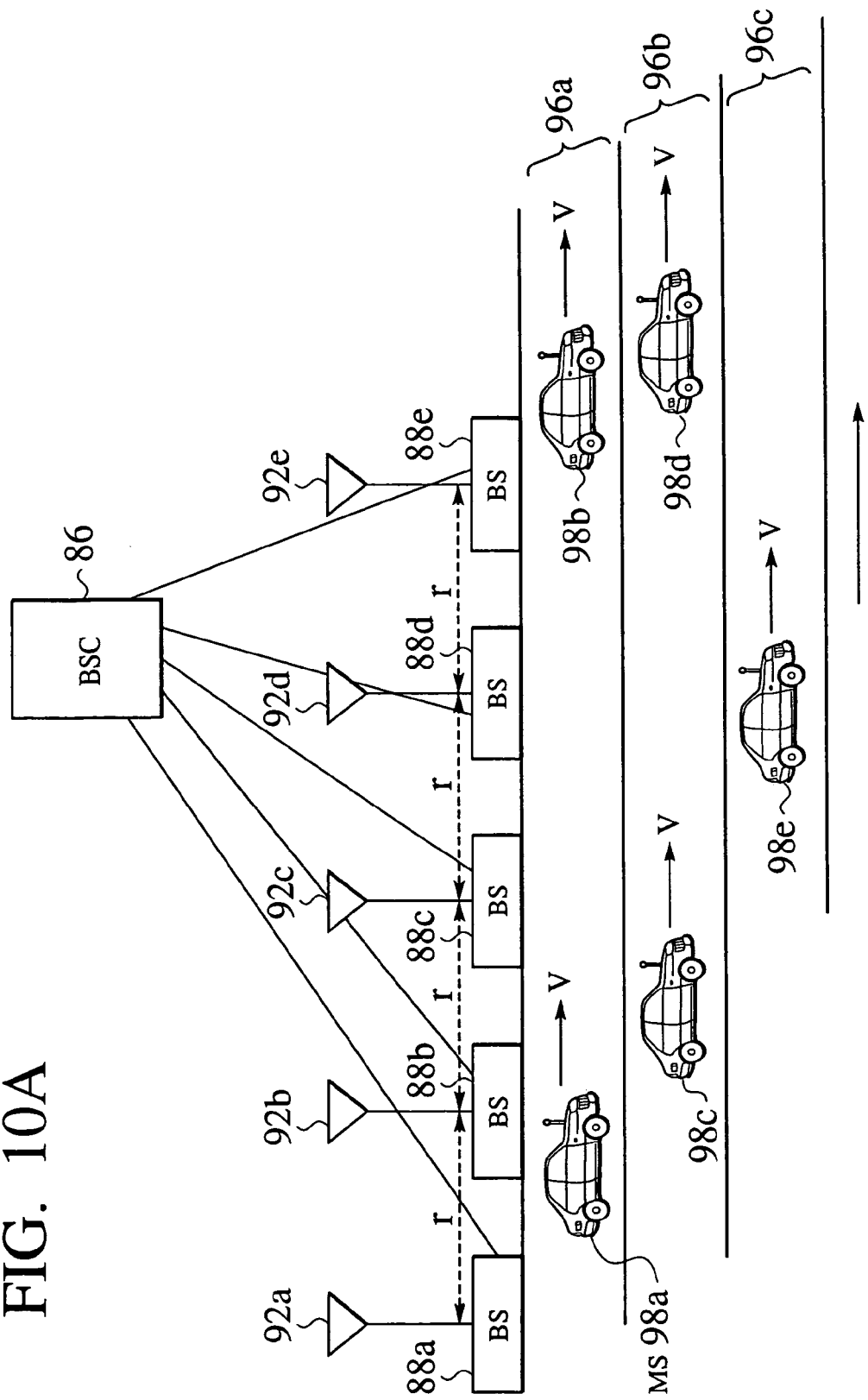
FIGS. 10A and 10B are views explaining a second radio channel setting example according to the second embodiment of the present invention.

A second radio channel setting example according to the second embodiment of the present invention will be described below. FIG. 10A is a view explaining this second setting example. The equal or similar symbols are given to the portions equal or similar to those of FIGS. 9A and 9B.

The grouping in the first radio channel setting example is done in accordance with the moving speed of the radio mobile station. However, in this second radio channel setting example, the grouping is done in accordance with a running lane of the radio mobile station. It is assumed in FIG. 10A that the radio mobile stations running on the same lane have the same speed.

The second radio channel setting example is carried out in the following procedure.

(a) The radio base station controller 86 detects a running lane of a radio mobile station 98, through each of the radio base stations 88. As a method for detecting this running lane of the radio mobile station 98, there may be a method for detecting from the sensor (the electric wave sensor, the optical sensor and the like) of the radio base station 88, a method for measuring a position of a mobile body itself through a sensor mounted in the mobile body itself installed in the radio mobile station 98 and then sending this information to the radio base station 88, and the like.

(b) The running lanes of the radio mobile stations 98 are grouped in accordance with the sensed running lanes of the radio mobile stations 98. This grouping is done depending on the number of radio channels which the radio base station controller 86 can use. As shown in FIG. 10A, the radio mobile stations 98a, 98b move on a lane 96a, the radio mobile stations 98c, 98d move on a lane 96b and the radio mobile station 98e moves on a lane 96c in the same direction. For this reason, the grouping is set, for example, such as a group 1 of the lane 96a, a group 2 of the lane 96b and a group 3 of the lane 96c.

Figure 10B:
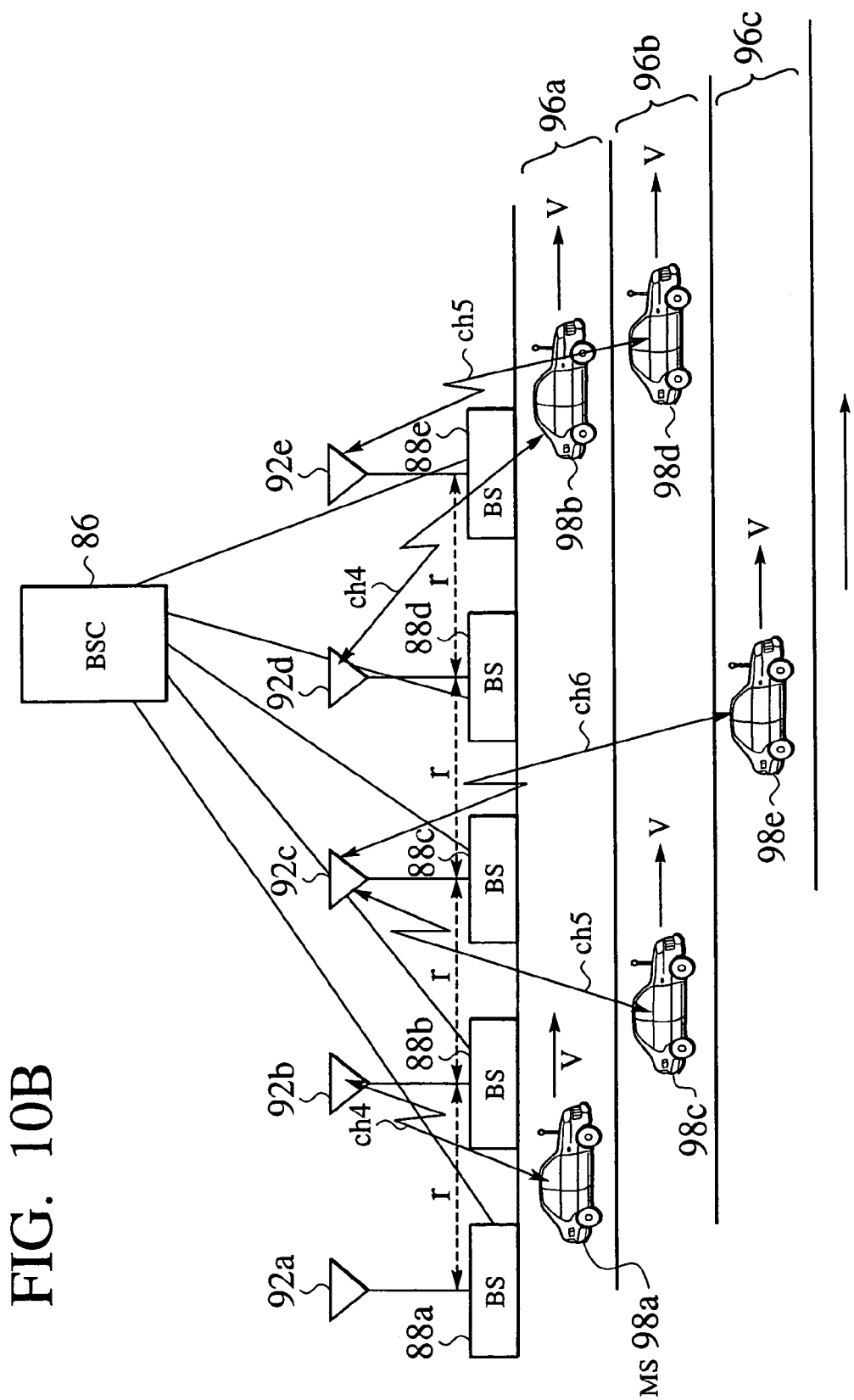

(c) The radio channel is assigned for each set group. FIG. 10B shows an example of the assignment. In FIG. 10B, a channel ch4 is assigned to the group 1 (the lane 96a), a channel ch5 is assigned to the group 2 (the lane 96b) and a channel ch6 is assigned to the group 3 (the lane 96c), respectively.

In this second radio channel setting example, the grouping is done for each radio mobile stations 98 running on the same lane. A different radio channel is assigned to each group. Accordingly, this prevents the beam patterns using the same channel from intersecting with each other (interfering with each other). Actually, as shown in FIG. 10B, the pass or the pursuit does not occur between the radio mobile stations 98 running on the different lanes. Thus, the same radio channel is assigned to each radio mobile stations 98 running on the same lane so as to avoid the interference in the same radio channel. Hence, the same radio channel can be repeatedly used.

That is, according to this second radio channel setting example, it is possible to improve the usage efficiency of the frequency and thereby reserve a larger number of radio channels. Also, this is effective for the Platoon run that is the car group run in which the distance between the cars is short Moreover, in this second radio channel setting example, if a distance between two different lanes is separated by a distance under which the radio channels used by the respective lanes do not interfere with each other, it is possible to further carry out a re-use of the same radio channel. For example, in FIG. 10B, the lane 96a and the lane 96c are spatially separated by a distance corresponding to a width of one lane (the lane 96b). Thus, if the channel ch4 and the channel ch6 have the same channel, the number of channels can be reduced from 4 to 2. Hence, it is possible to further improve the usage efficiency of the frequency.

(Third Radio Channel Setting Example)

Figure 11:
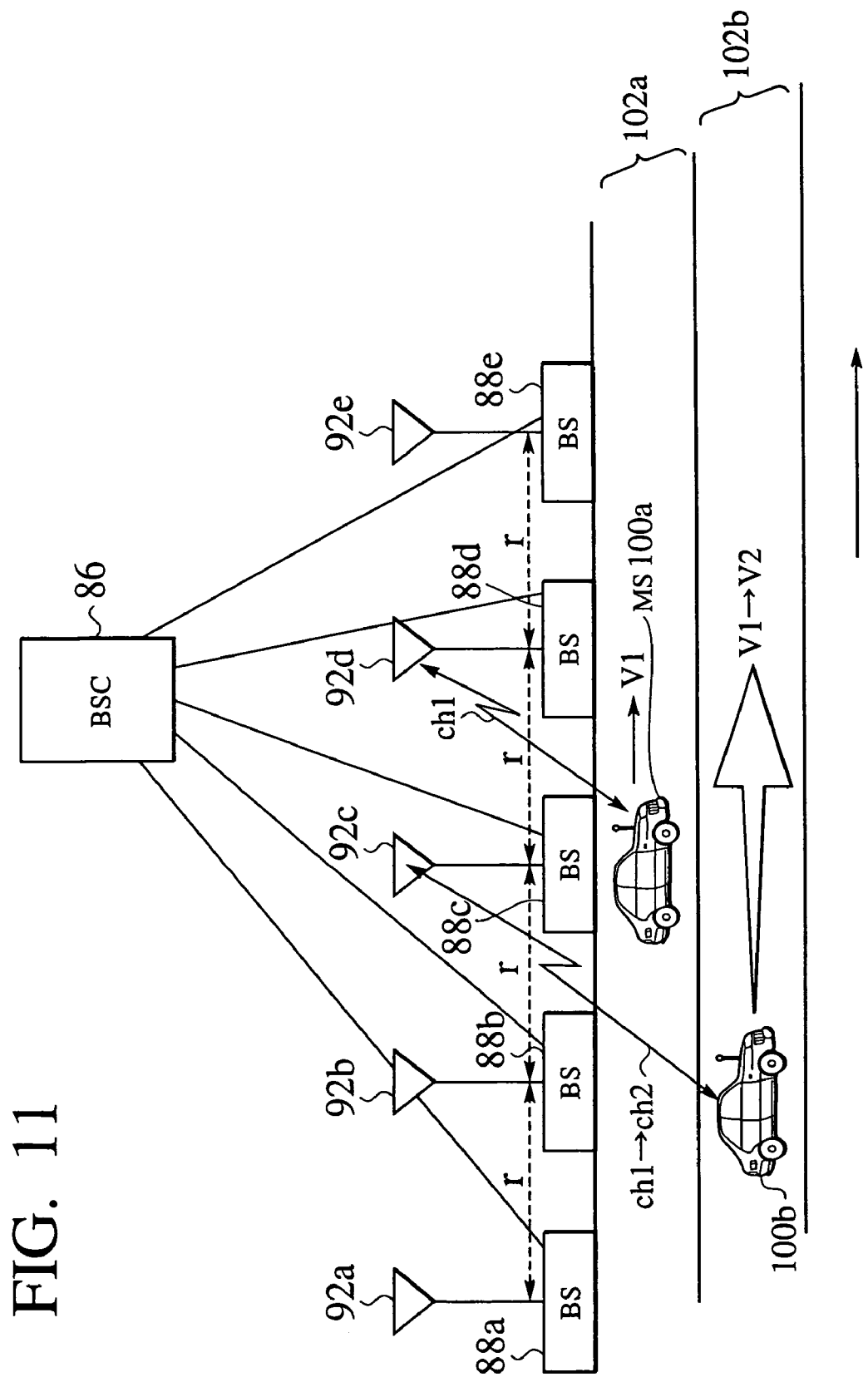
FIG. 11 is a view explaining a third radio channel setting example according to the second embodiment of the present invention.

A third radio channel setting example according to the second embodiment of the present invention will be described below. FIG. 11 is a view explaining this third radio channel setting example. The equal or similar symbols are given to the portions equal or similar to those of FIGS. 9A and 9B. This third setting example is applied to a case that the speed of the radio mobile station is changed, in the first and second setting examples. Here, let us suppose that the number of available radio channels is 2, and the grouping is done for each different two movement speeds of the radio mobile station.

In FIG. 11, at first, a radio mobile station 100a runs on a lane 102a, and a radio mobile station 100b runs on a lane 102b, respectively. Both run at the same speed v1 (=80 km/h). The grouping is done in accordance with moving speeds of the radio mobile stations 100. For example, it is set such as a group 1 of a speed v1 and a group 2 of a speed v2 (=100 km/h). Then, a channel ch1 is assigned to the group 1 (the radio mobile stations 100a, 100b), and a channel ch2 is assigned to the group 2.

After that, when the radio mobile station 100b accelerates its speed and increases its speed up to the v2, the radio mobile station 100b passes the radio mobile station 100a ahead. So, the mutual interference of the channel ch1 may is induced. Thus, in this case, the channel assigned to the radio mobile station 100b is changed from ch1 to ch2.

In this way, according to the third radio channel setting example, it is possible to avoid in advance the situation that the radio mobile stations using the same channel interfere with each other. In short, the change of the channel disables the beam patterns of the antenna 92 to intersect with each other, as shown in FIG. 11. Thus, it is possible to protect the interference in the same channel. Moreover, if the speed is conversely decreased, it is possible to similarly change the channel to thereby protect the interference in the same channel.

(Fourth Radio Channel Setting Example)

Figure 12:
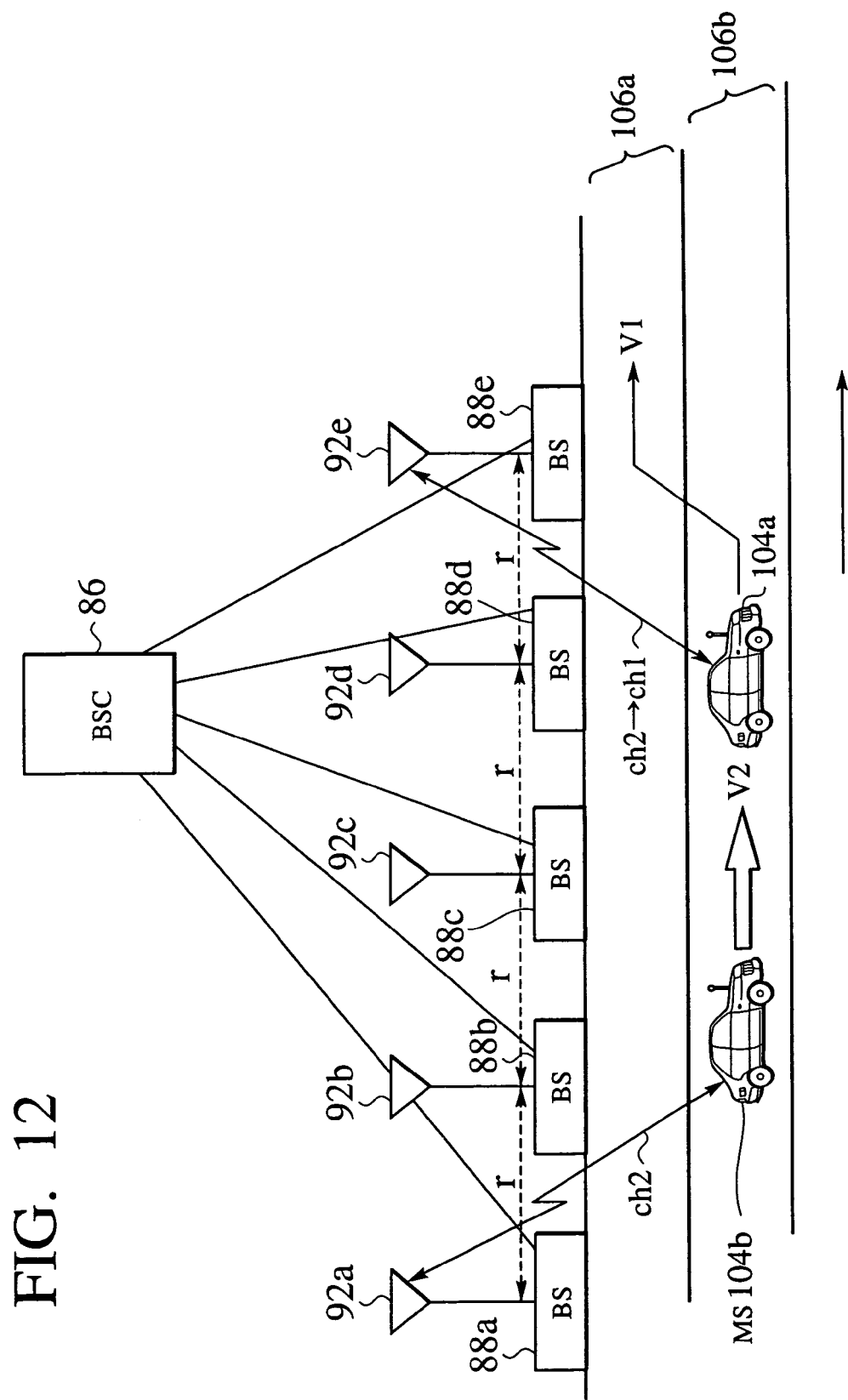
FIG. 12 is a view explaining a fourth radio channel setting example according to the second embodiment of the present invention.

A fourth radio channel setting example according to the second embodiment of the present invention will be described below. FIG. 12 is a view explaining this fourth radio channel setting example. The equal or similar symbols are given to the portions equal or similar to those of FIGS. 9A and 9B. This fourth setting example is applied to a case that the running lane of the radio mobile station is changed, in the first and second setting examples. Here, let us suppose that the number of available radio channels is 2, and the grouping is done for each different two movement lanes of the radio mobile station.

In FIG. 12, at first, a radio mobile station 104a runs on a lane 106b at a speed v1 (=80 km/h). Behind the radio mobile station 104a, a radio mobile station 104b runs on the same lane 106b at a speed v2 (=100 km/h). The grouping is done in accordance with running lanes of the radio mobile stations 104. For example, it is set such as a group 1 of a running lane 106a and a group 2 of the running lane 106b (the radio mobile stations 104a, 104b). Then, a channel ch1 is assigned to the group 1, and a channel ch2 is assigned to the group 2.

After that, when the radio mobile station 104b moves in close to the radio mobile station 104a and then the radio mobile station 104a gives the lane to the radio mobile station 104b, it is necessary to change the lane of the radio mobile station 104a. In this case, the radio base station controller 86 controls so as to change the channel assigned to the radio mobile station 104a from ch1 to ch2.

In this way, according to the fourth radio channel setting example, it is possible to avoid the pass or the pursuit between the radio mobile stations to which the same channel is assigned. Thus, it is possible to protect the beam patterns of the antenna 92 from intersecting with each other, as shown in FIG. 12. Hence, the interference in the same channel can be avoided, and the same channel can be used in a wide range to thereby improve the usage efficiency of the frequency.

(Fifth Radio Channel Setting Example)

Figure 13:
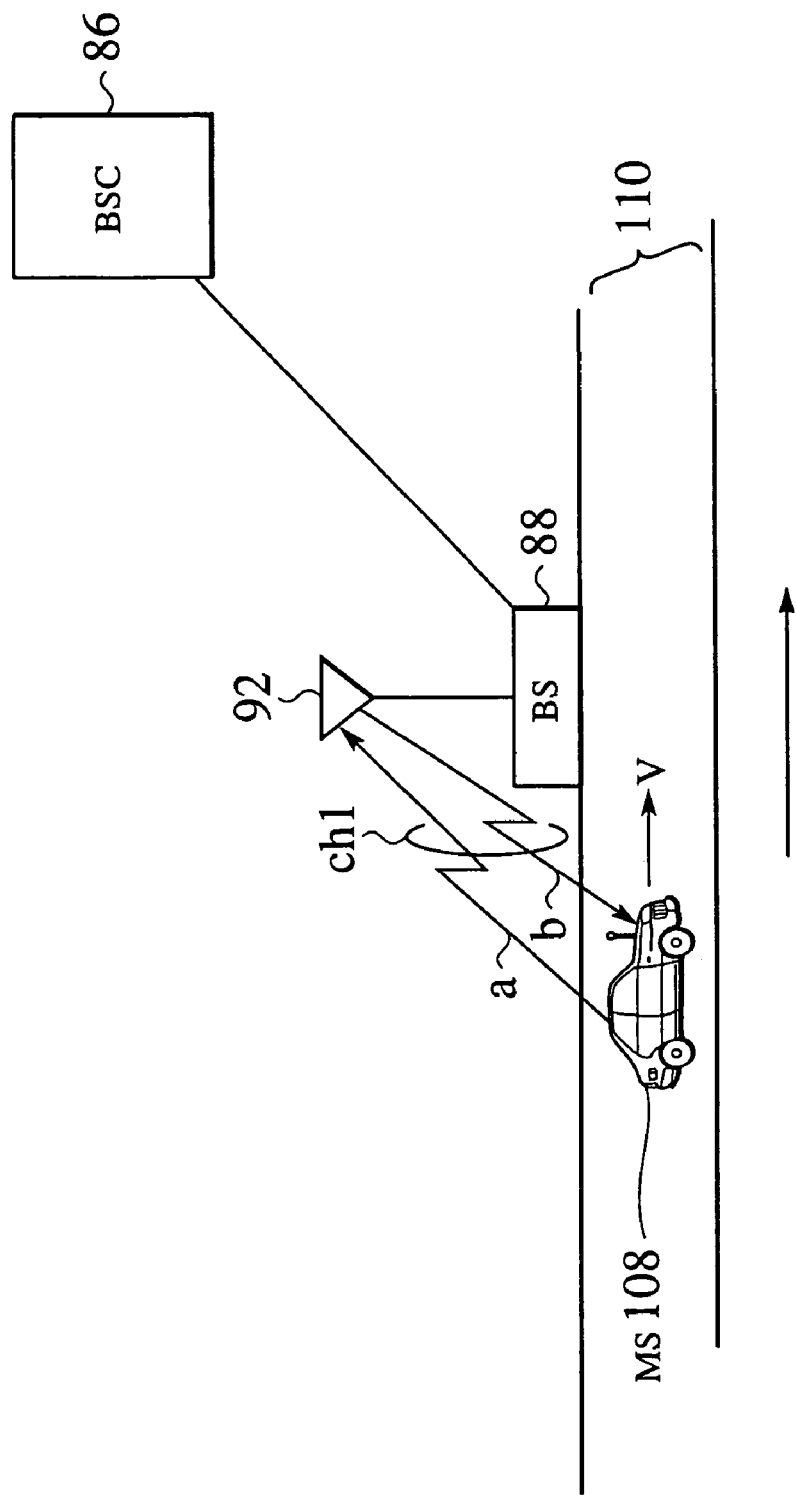
FIG. 13 is a view explaining a fifth radio channel setting example according to the second embodiment of the present invention.

A fifth radio channel setting example according to the second embodiment of the present invention will be described below. FIG. 13 is a view explaining this fifth radio channel setting example. This fifth radio channel setting example shows the example in which the radio base station controller detects a moving speed and a position information (for example, a running lane) of the radio mobile station, in the first to fourth setting examples. The equal or similar symbols are given to the portions equal or similar to those of FIGS. 9A and 9B.

In FIG. 13, a radio mobile station 108 recognizes its moving speed by using a speed meter, a gyro, a GPS, a magnetic sensor and the like. Also, it recognizes its position information by using a gyro, a GPS, a magnetic sensor, a CCD camera and the like. Then, the radio mobile station 108 uses a channel ch1, and sends the speed information and the position information as a transmission information "a" through a radio base station 92 to the radio base station controller 86.

On the other hand, the radio mobile station 108 uses the channel ch1, receives a reception information "b" through the radio base station 92, and obtains a road traffic information from the radio base station controller 86.

In this way, in this fifth radio communication system, the radio base station controller 86 can detect the moving speed and the position information of the radio mobile station 108 through the radio base station 92, and can easily carry out the assignment of the channel.

(Sixth Radio Channel Setting Example)

Figure 14:
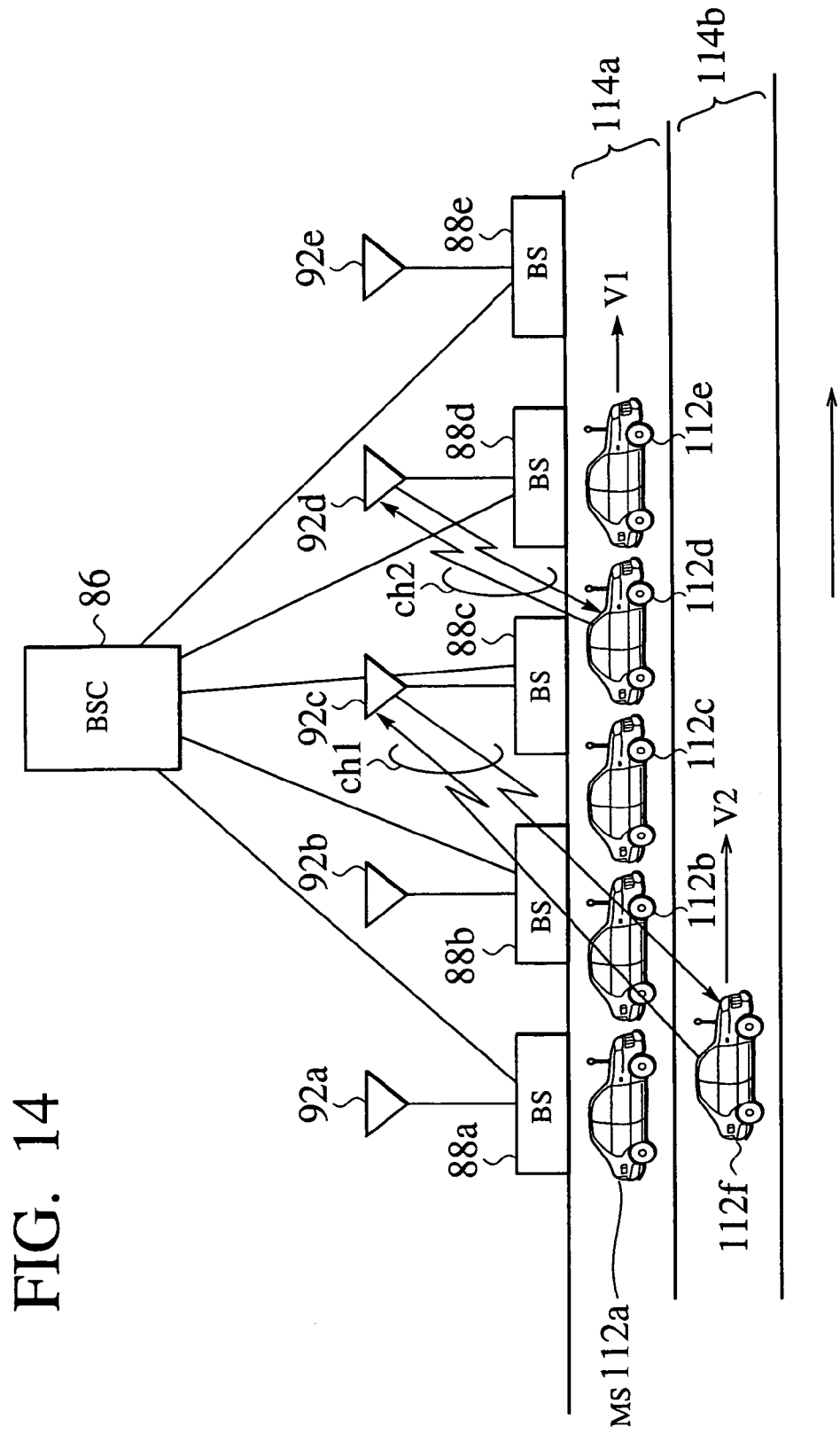
FIG. 14 is a view explaining a sixth radio channel setting example according to the second embodiment of the present invention

A sixth radio channel setting example according to the second embodiment of the present invention will be described below. FIG. 14 is a view explaining this sixth radio channel setting example. This sixth setting example is applied to an example in which a plurality of radio mobile stations have the moving speeds different from each other. The equal or similar symbols are given to the portions equal or similar to those of FIGS. 9A and 9B In FIG. 14, a plurality of radio mobile stations 112a, 112b, 112c, 112d and 112e run on a lane 114a at the same speed v1 (relatively slow speed). Also, a radio mobile station 112f runs on a lane 114b at a speed v2 (relatively fast speed). Actually, an occurrence of an accident, a position close to an interchange and the like cause a traffic jam to be induced on the lane 114a. Thus, this fact makes the speeds of the radio mobile stations 112a, 112b, 112c, 112d and 112e slower. On the other hand, the traffic jam is not induced on the lane 114b. So, the radio mobile station 112f smoothly moves, and its speed is fast.

On the lane 114b in which the traffic jam is not induced, the moving speed of the radio mobile station 112f is fast to thereby make a frequency of a hand-over process between the radio base stations 88 higher. On the other hand, on the lane 114a in which the traffic jam is induced, a distance between the cars becomes short to thereby increase the number of radio mobile stations 112 managed by one radio base station 88. However, the frequency of the hand-over process is dropped. Moreover, the changes in the position information and the speed information given by the radio mobile station 112 and the road traffic information given by the radio base station 88 are gentle. For this reason, when the radio mobile station 112 is stopped or the traffic jam is induced, a temporal interval to communicate with the radio base station 88 can be wider as compared with the case of the fast moving speed. Hence, it is possible to further carry out the re-use of the same channel and also possible to improve the usage efficiency of the frequency.

In the first and second embodiments of the present invention, in order that the radio base station controller 86 controls the hand-over process of the radio mobile station 112, the beam pattern generated by the antenna 92 of each radio base station 88 must follow the radio mobile station 112. Thus, it is necessary to transmit and receive some radio signal between the radio base station 88 and the radio mobile station 112 at all times. Here, it is necessary to carry out this transmission/reception at least one time within a beam area in which one beam is generated. This is because as described in the first embodiment of the present invention, the radio base station controller 86 receives the transmission signal of the radio mobile station 112 to thereby select the optimal transmission beam pattern. Hence, the radio mobile station 112 must transmit some transmission signal through the radio base station 88 to the radio base station controller 86 even if there is no information to be sent. In this case, the transmission signal to the radio base station controller 86 from the radio mobile station 112 may be basically any type if it is a signal that can uniquely point out the radio mobile station 112. For example, it is enough to use an empty packet having no data. This is because a packet enables the radio mobile station 112 to be pointed out from its header information.

Its transmission period is established on the basis of the moving speed of the radio mobile station 112. Actually, if the radio mobile station 112 moves at a high speed, a switching frequency of the beam pattern is high. Thus, it is enough to make the transmission period shorter. Conversely, if it moves at a low speed, the switching frequency is low. Hence, it is enough to make the transmission period longer. Accordingly, the radio base station controller 86 can generate the optimal transmission beam pattern without using an external sensor and the like, and control the radio mobile station process of the radio mobile station 112 within the management area.

Third Embodiment

Figure 15:
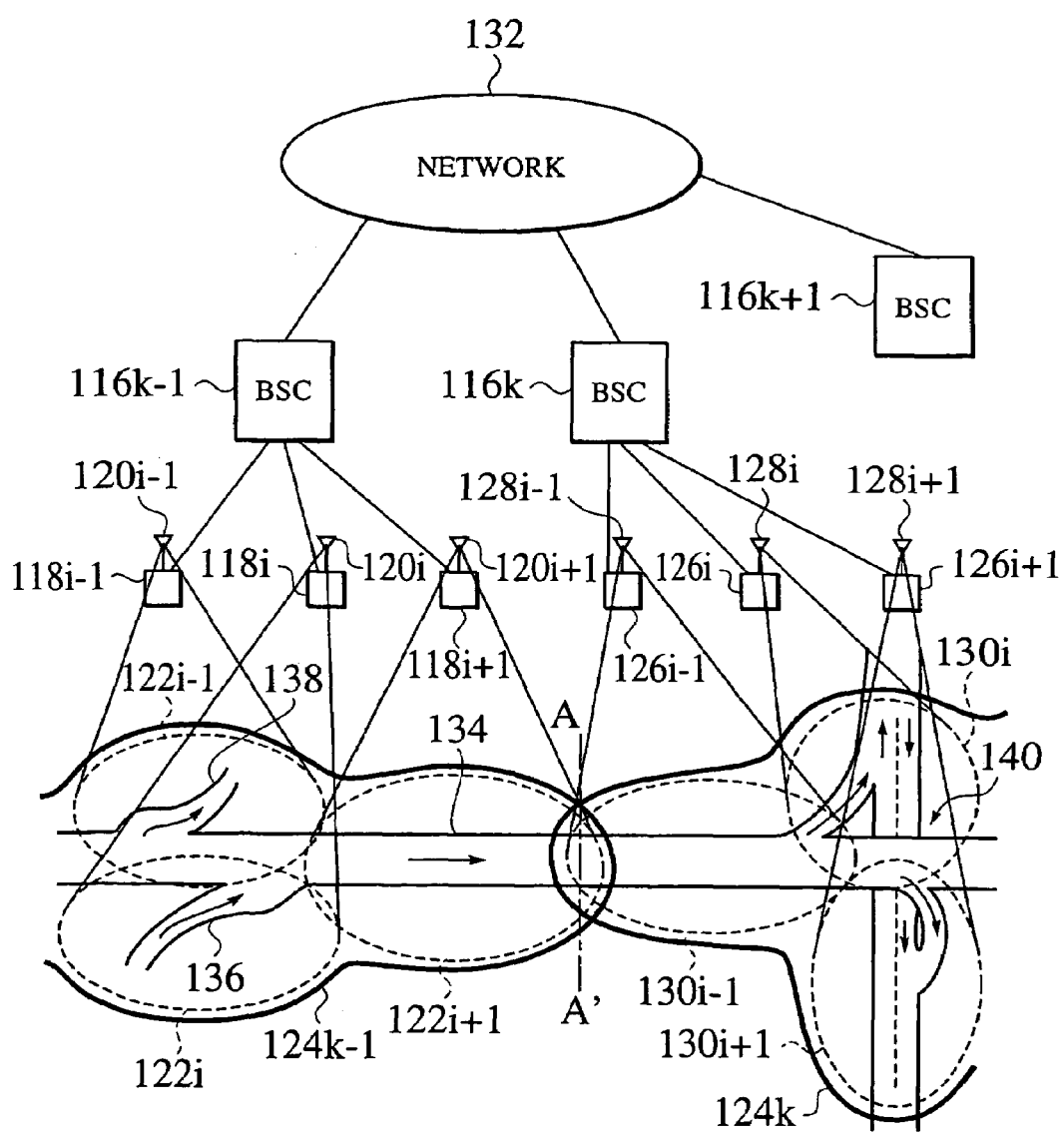
FIG. 15 is a view showing a configuration of a radio communication system according to a third embodiment of the present invention.

A third embodiment of the present invention will be described below. The first and second embodiments are the embodiment with regard to the hand-over process between the radio base stations within the area managed by one radio base station controller. However, this third embodiment is an embodiment with regard to a hand-over process between two different radio base station controllers. FIG. 15 is a view showing a configuration of a radio communication system according to the third embodiment of the present invention. In the radio communication system according to the third embodiment of the present invention, similarly to the first embodiment, a plurality of areas (cells) managed by each base station are gathered to constitute the entire service area in the mobile communication network. Also, in FIG. 15, the explanation is done under the assumption that the number of base stations managed by one base station controller is 3, for the purpose of simple illustration.

In the radio communication system according to the third embodiment of the present invention of FIG. 15, a radio base station controller 116k−1 is connected to three radio base stations 118i−1, 118i and 118i+1, and controls them. Each radio base station 118 generates a plurality of beam patterns, and has antennas 120i−1, 120i and 120i+1 through which a radio communication with a radio mobile station (not shown) can be done respectively. Each radio base station 118 carries out a radio communication with a radio mobile station within the managing base station areas 122i−1, 122i and 122i+1, under the control of the beam pattern of each antenna 120. In short, the radio base station controller 116k−1 manages an entire area 124k−1 composed of the plurality of base station areas 122.

Similarly, the radio base station controller 116k is connected to three radio base stations 126i−1, 126i and 126i+1, and controls them. Each radio base station 126 generates a plurality of beam patterns, and has antennas 128i−1, 128i and 128i+1 through which a radio communication with a radio mobile station (not shown) can be done respectively. Each radio base station 126 carries out a radio communication with a radio mobile station within the managing base station areas 130i−1, 130i and 130i+1, under the control of the beam pattern of each antenna 128. Namely, the radio base station controller 116k manages an entire area 124k composed of the plurality of base station areas 130.

Although not shown, the radio base station controller 116k+1 is similarly connected to three radio base stations, and controls an entire area 124k+1 (not shown). Moreover, the radio base station controllers 116k−1, 116k and 116k+1 are connected through a network 132 to each other.

The third embodiment of the present invention especially targets the inter-lane communication in the high road traffic system (ITS), similarly to the first and second embodiments. As exemplified in FIG. 15, an incoming road 136, an outgoing road 138, an interchange 140 and the like are connected to a straight road 134 on which the radio mobile station is running. The radio base station 118 connected to each radio base station controller 116k needs to cover all of them.

The feature of the third embodiment lies in a mechanism that a boundary between cover areas of each radio base station controller 116 is arranged on a straight road. For example, in a case of FIG. 15, a boundary A-A' between a cover area 124k−1 of the radio base station controller 116k−1 and a cover area 124k of the radio base station controller 116k is arranged on the straight line 134. Such an arrangement enables the control of the hand-over process between the radio base station controllers 116 which is the most complex to be simplified.

That is, the base station areas 122, 130 of the radio base station 118 which are the movement destinations of a radio mobile station can be uniquely determined by arranging this boundary A-A' on the straight line 134. Thus, the radio base stations 118, 126 of the hand-over destination can be pointed out to thereby simplify the control of the hand-over process.

Usually, the establishment of a communication line must be again done from the beginning in many cases, in the hand-over process between the radio base station controllers 116. In such a case, it takes a long time to carry out the hand-over. So, there may be a possibility of a stop of a communication for a long time. In the inter-lane communication, an automatic drive of a mobile body is considered as a future subject. If it takes a long time to carry out the hand-over, there may be a possibility that this brings about a fatal problem. According to the third embodiment of the present invention, such a problem can be solved by arranging the boundary between the cover areas 124 of the radio base station controllers 116 on the straight line 134. Hence, this is very effective in view of improving the reliability of the communication and the safety.

According to the first and second embodiments, it is easy to control the beam patterns within the plurality of radio base stations 118, 126 managed by one radio base station controller 116. So, the hand-over between the radio base stations 118, 126 can be relatively easily done at a high reliability. Thus, as for the incoming road 136, the outgoing road 138, the interchange 140 and the like, the respective radio base stations 118, 126 are arranged such that they can be covered by the areas of the radio base stations 118, 126 controlled (connected) by one radio base station controller 116. Hence, the radio communication system as a whole can attain the communication having the higher reliability.

As mentioned above, according to the third embodiment of the present invention, the hand-over destination (movement destination) of the radio mobile station between the radio base station controllers can be pointed out to thereby make the control of the hand-over process in the radio mobile station easier.

Fourth Embodiment

Figure 16:
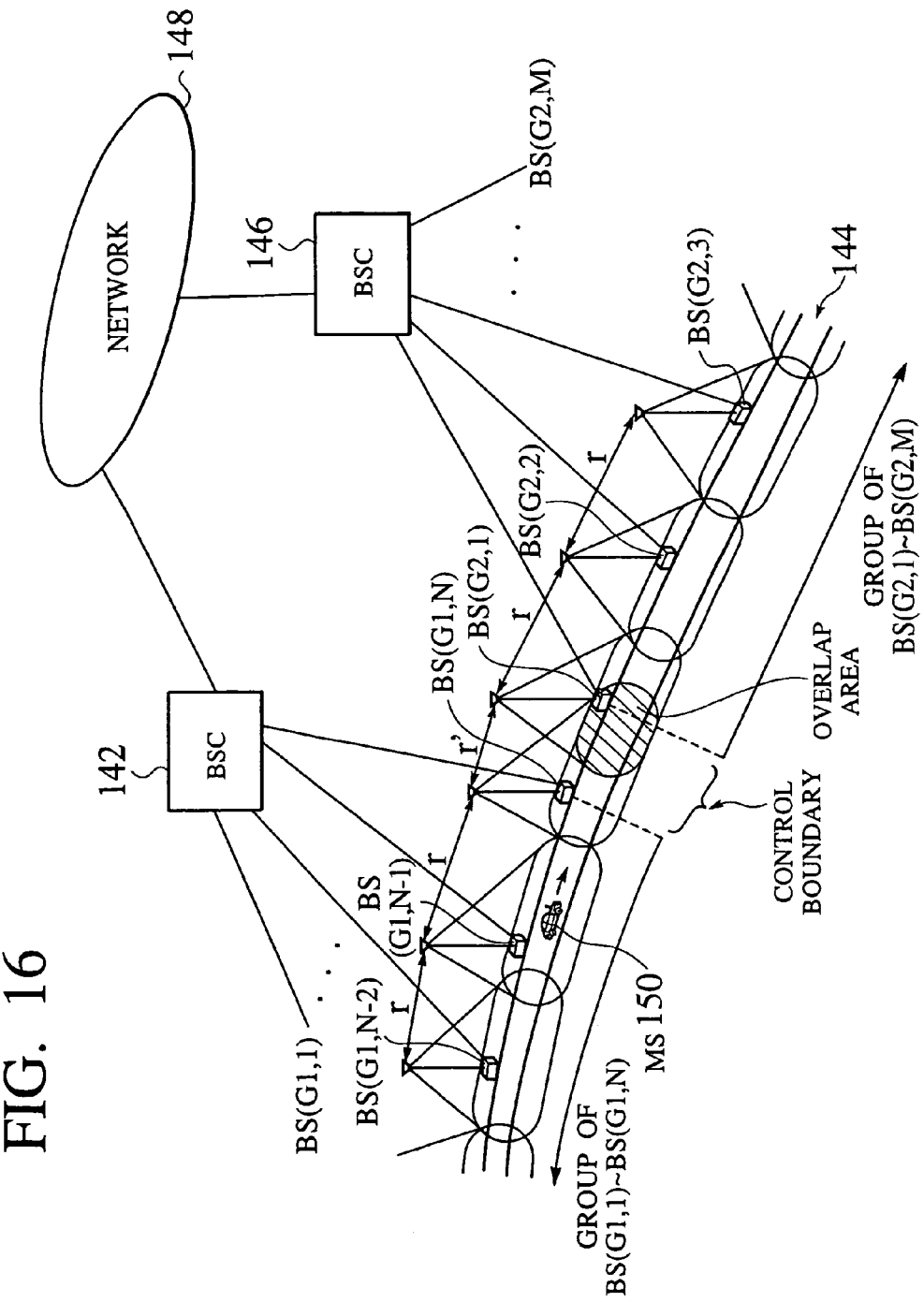
FIG. 16 is a view showing a configuration of a radio communication system according to a fourth embodiment of the present invention.

A fourth embodiment of the present invention will be described below. This fourth embodiment shows the actual control example of the hand-over process between the radio base station controllers, in the third embodiment. FIG. 16 is a view showing a configuration of a radio communication system according to the fourth embodiment of the present invention. In the radio communication system according to the fourth embodiment of the present invention, similarly to the first to fourth embodiments, the plurality of areas (cells) managed by each base station are gathered to constitute the entire service area in the mobile communication network.

In the radio communication system according to the fourth embodiment of the present invention, a first radio base station controller 142 is connected to N radio base stations BS (G1, 1), BS (G1,2), BS (G1,3), . . . , BS (G1,N-2), BS (G1,N-1) and BS (G1,N), and controls them. The first radio base station controller 142 uses a first radio base station group G1 composed of the N radio base stations BS (G1,1) to BS (G1,N) and gives an ITS service to a part on a road 144. Similarly, a second radio base station controller 146 is connected to M radio base stations BS (G2,1), BS (G2,2), BS (G2,3), . . . , BS (G2,M-2), BS (G2,M-1) and BS (G2,M), and controls them. The second radio base station controller 146 uses a second radio base station group G2 composed of the M radio base stations BS (G2,1) to BS (G2,M) and gives an ITS service to another part on the road 144. The first radio base station controller 142 and the second radio base station controller 146 can send and receive a communication call to and from a radio mobile station 150 through a network 148. In FIG. 6, it is assumed that the radio mobile station 150 moves in a direction from the first radio base station group G1 to the second radio base station group G2, on the road 144.

The first and second radio base station controllers 142, 146 have a function of sequentially monitoring a radio base station communicating with the radio mobile station 150, in the first and second radio base station groups G1, G2 managed by the respective radio base station controllers 142, 146. Moreover, they control the hand-over processes between the radio base stations within the radio base station groups managed by the respective radio base station controllers 142, 146, similarly to the first and second embodiments.

Figure 17:
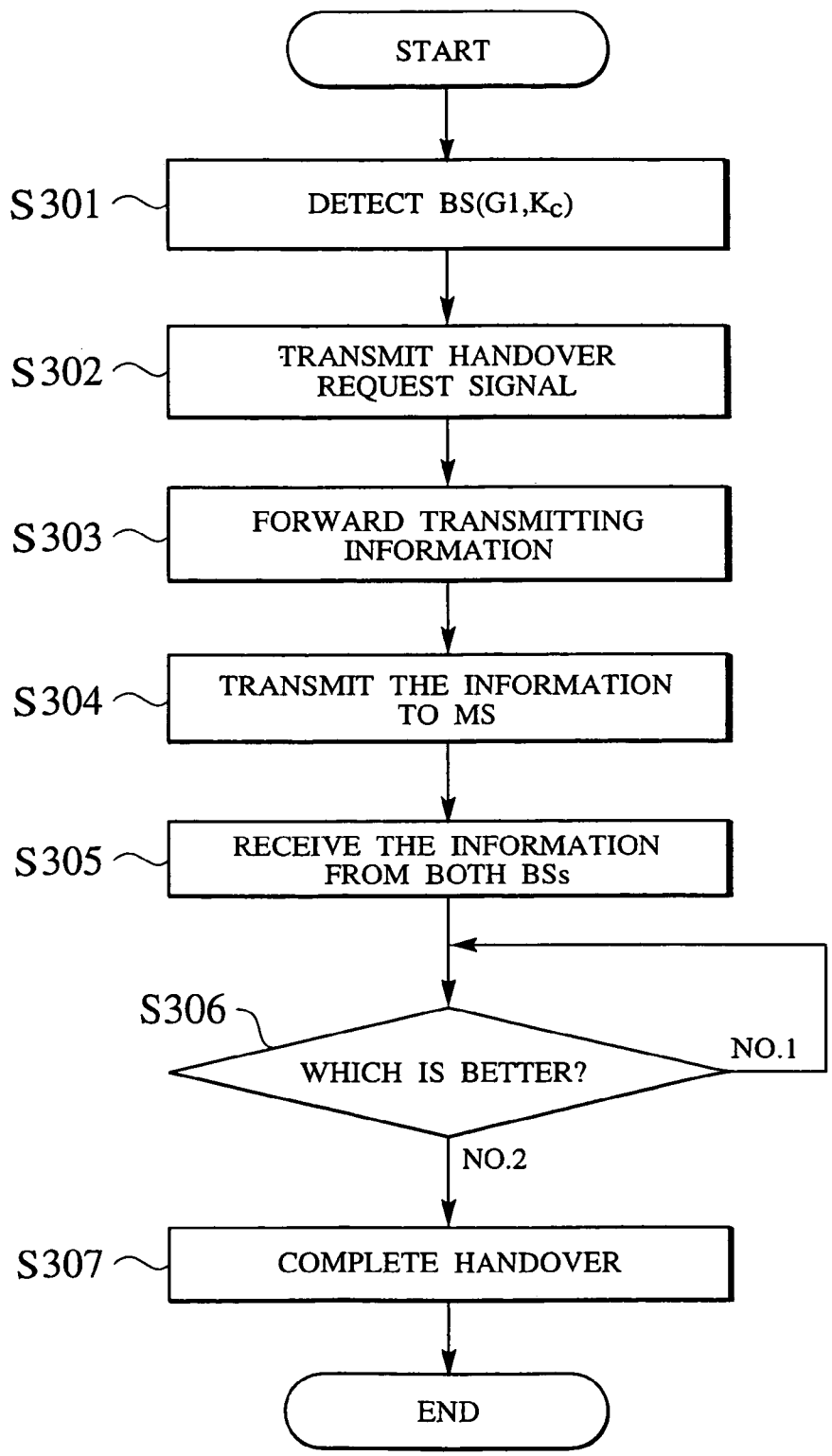
FIG. 17 is a flowchart showing a procedure of a hand-over process according to a fourth embodiment of the present invention.

The operation of the fourth embodiment of the present invention will be described below with reference to FIG. 17. FIG. 17 is a flowchart showing a procedure of the hand-over process according to the fourth embodiment of the present invention. As shown in FIG. 17, the first radio base station controller 142 detects a start of a communication between the radio mobile station 150 and a radio base station BS (G1,Kc) (Kc≦N) serving as a start point of the hand-over process, in conjunction with a movement of the radio mobile station 150 (Step S301). Here, the radio base station BS (G1,Kc) is the radio base station within the radio base station group G1 close to a boundary (hereafter, referred to as a control boundary) between the radio base station group G1 controlled by the first radio base station controller 142 and the radio base station group G2 controlled by the second radio base station controller. Actually, it corresponds to a radio base station BS (G1,N) that is the closest to the control boundary, or a radio base station BS (G1,K) (K<1) in the vicinity of the control boundary, such as a radio base station BS (G1,N-1) or BS (G1,N-2) adjacent to the radio base station BS (G1,N), in a case of FIG. 16.

The first radio base station controller 142, when detecting the start of the communication between the radio mobile station 150 and the radio base station BS (G1,Kc), sends a control signal (hand-over request signal) requesting a start of a hand-over process operation through the radio base station BS (G1,Kc) to the radio mobile station 150 (Step S302).

The first radio base station controller 142 transfers an information sent to the radio mobile station 150 from the radio base station BS (G1,Kc), through the network 148 to the second radio base station controller 146 (Step S303).

The second radio base station controller 146 transmits a signal including the transferred information, through a radio base station BS (G2,Lc) (Lc≧1) close to the control boundary, to the radio mobile station 150. This transmission is done in accordance with a command to the second radio base station controller 146 from the first radio base station controller 142 (Step S304). Here, the radio base station BS (G2,Lc) is the radio base station within the radio base station group G2, which is close to the control boundary. Actually, it corresponds to a radio base station BS (G2,1) that is the closest to the control boundary, or a radio base station BS (G1,L) (L>1) in the vicinity of the control boundary, such as a radio base station BS (G2,2) or BS (Q2,3) adjacent to the radio base station BS (G2,1), in a case of FIG. 16.

The radio mobile station 150 starting the hand-over process starts receiving two signals including the same information, which are sent from both the radio base station groups G1, G2 (Step S305).

The radio mobile station 150 receiving the two signals compares their reception states at a certain cycle. It continues the comparison, as long as the reception state of the signal from the radio base station group G1 (the hand-over source) is better (Step S306).

Then, it stops receiving the signal from the radio base station group G1 when the reception state of the signal from the radio base station group G2 (the hand-over destination) becomes better, in conjunction with the movement of the radio mobile station 150, and completes the hand-over process (Step S307). Two processes as described below may be considered as the actual processes after the radio mobile station 150 stops receiving the signal from the radio base station group G1.

(1) The radio mobile station 150 stops receiving the signal from the radio base station group G1, and reports the stop of the process through the radio base station group G2 to the second radio base station controller 146. The second radio base station controller 146 reports its fact to the first radio base station controller 142. The first radio base station controller 142 receiving its report stops the transmission to the radio mobile station 150. This first process has the effect of protecting an error operation such as an erroneous stop of the transmission from the radio base station group G1 of the first radio base station controller 142, if the moving speed of the radio mobile station 150 is very slow because of the traffic jam and the like, and a variation in a reception strength of the signal to the radio base station group G1 from the radio mobile station 150 is not evident.

(2) The first radio base station controller 142 detects the reception strength of the transmission signal to the radio base station group G1 from the radio mobile station 150, and stops the transmission when a sufficient quality is not obtained. Then, the transmission/reception control to the radio mobile station 150 is turned over to the second radio base station controller 146. According to this second process, the signal between the radio base station controllers and another control signal can be reduced as compared with the first process.

Typically, in the TDMA mobile communication, the comparison of a reception quality such as a reception field strength and the like is carried out in a plurality of slots. The hand-over is carried out by detecting the fact that the reception quality from the radio base station communicated until that time is inferior to a reception quality from another radio base station. In this case, an operation for the hand-over control between the radio base station controllers is actually carried out from the judgment of the reception quality. So, the time necessary for the completion of the hand-over becomes very long. For this reason, in order to carry out the hand-over without the quality deterioration even in the radio mobile station moving at a high speed, it is necessary to reserve a very large overlap area between two base station areas close to the control boundary.

On the contrary, if the radio mobile station moves towards a constant direction without any branch such as an expressway, it is possible to predict in advance a positional range of an occurrence of the hand-over between the radio base station controllers such as the control boundary or the like. The feature of the fourth embodiment of the present invention lies in a mechanism that in the positional range where this predictable hand-over is induced, an information to be transmitted is shared in advance between the radio base station controllers adjacent to each other, and it is simultaneously transmitted to the same radio mobile station. This feature enables the reduction in the overlap area between the radio base station controllers, even if the moving speed is very fast such as the expressway, as compared with a method depending on only the comparison of the reception quality such as the reception field strength in the case of the hand-over in the TDMA mobile communication. Moreover, this provides a merit of largely reducing a possibility of an interruption of a communication and also shortening a control time.

In the fourth embodiment of the present invention, the setting of the radio channel when both the radio base station groups G1, G2 transmit signals including the same information may be considered as follows. At first, it may be considered to basically transmit the signals at the same frequency and obtain a diversity effect in a small frequency offset, if using a multi-office simultaneity communication (for example, noted in "Foundation of Mobile Communication" reported by Shinshi Okumura, and announced in Electronic Information Communication Society, p. 180, 1986). This case does not require a new assignment of another communication slot. So, it is possible to obtain an effect of improving a usage efficiency of a frequency and simplifying a control. Also, the transmissions through the same slot may be considered if a TDM slot synchronization can be reserved between the first and second radio base station controllers 142, 146. In addition, it may be considered that another TDM slot is used in a case of TDM, and a receiving side receives a plurality of TDM slots. Moreover, it may be considered that another diffusion code is used in a case of CDM, and a receiving side performs an inverse diffusion on a plurality of codes.

As described in the second embodiment, the first radio base station controller 142 can have the function of obtaining the speed information of the radio mobile station 150. Thus, in the fourth embodiment of the present invention, the first radio base station controller 142 can properly select a position of the radio base station BS (G1,Kc) from the radio base station group G1, in accordance with the moving speed of the radio mobile station 150, and thereby improve the reliability of the hand-over process, and accordingly reduce the consumptive electric power.

That is, if the speed of the radio mobile station 150 is fast, the radio base station BS (G1,Kc) is moved to a direction away from the control boundary between the first and second radio base station controllers 142, 146. Accordingly, a time required for the radio mobile station 150 to reach the control boundary can be made longer. Thus, the hand-over process can be completely ended within the time. Hence, it is possible to protect the radio mobile station 150, in which the hand-over is not still ended, from coming into the area of the adjacent radio base station group G2.

On the contrary, for example, in a condition that an occurrence of the traffic jam of the radio mobile stations (cars) causes the speed to be very slow or causes the radio mobile station 150 to be stopped, it is enough to shift the radio base station BS (G1,Kc) to a direction closer to the control boundary. This reason is as follows. That is, if the radio base station BS (G1,Kc) is far away from the control boundary in the case of the slow speed of the radio mobile station 150, the control is started earlier than a timing when the hand-over control should be actually started. Thus, although the radio mobile station 150 does not still reach the area of the radio base station group G2, a transmission signal for the hand-over is uselessly transmitted from the side of the radio base station group G2. Also, the reception operations in a plurality of base stations for the hand-over are uselessly carried out even in the radio mobile station 150, which thereby brings about the increase in the consumptive electric power. Especially, the number of radio mobile stations 150 managed by one radio base station is very large in a case of the traffic jam, the position near the interchange and the like. Hence, a traffic density becomes much denser due to the communication with regard to the hand-over. Hence, a scrap rate of a packet in which a congestion is liable to be induced becomes large to thereby deteriorate the communication situation.

In the fourth embodiment of the present invention, the respective radio base stations in the radio base station groups G1, G2 are arranged in a certain interval "r" along the road 144, on the straight portion of the road 144. Here, if an interval "r'" between a radio base station BS (G1,N) that is the closest to the control boundary and a radio base station BS (G2,1) is made shorter, it is possible to widen a range in which a base station area of the radio base station BS (G1,N) and a base station area of the radio base station BS (G2,1) overlaps with each other, even if the similar antenna and transmission electric power are used in the respective radio base stations. Thus, it is possible to obtain an effect of reducing a probability that a communication with an infrastructure side is interrupted within the time required for the radio mobile station 150 to carry out the hand-over.

If a plurality of modulation manners having different transmission rates are permitted at a time of the transmission/reception in the first and second radio base station controllers 142, 146 according to the fourth embodiment of the present invention, it is enough to basically select the modulation manner having the lower transmission rate at the time of the transmission/reception in the hand-over operation. Accordingly, it is possible to earlier obtain a bit synchronization of an accuracy necessary for the communication between the radio mobile station 150 and a radio base station belonging to the radio base station group G2, as compared with a case of the higher transmission rate. Thus, it is possible to obtain an effect of shortening a time necessary for the hand-over operation. Similarly, if a plurality of coding manners having different-error correction codes are permitted, it is enough to basically select the manner having a stronger durability for a transmission error. Of course, it is not always necessary to select a modulation manner having the lowest transmission rate or a coding manner having the strongest durability for the transmission error. The selection of the modulation manner or the coding manner should be done flexibly in accordance with the moving speed of the radio mobile station 150. For example, with regard to the radio mobile station 150 moving at a high speed, it is enough to select the modulation manner having the lowest transmission rate or the coding manner having the strongest durability for the transmission error. On the other hand, with regard to the radio mobile station 150 moving at a low speed, it is not always necessary to select the modulation manner having the lowest transmission rate or the coding manner having the strongest durability for the transmission error By the way, as the plurality of modulation manners having the different transmission rates, there may be, for example, a case that only baud rates are different although signal point transitions are equal, a case that the signal point transitions are different although the baud rates are equal (for example, QPSK and 16QAM) and a case that both the baud rate and the signal point transition are changed.

Also, as the plurality of modulation manners, there may be: a combination of 1024QAM, 256QAM, 16QAM and QPSK, or a combination using at least two of them; 1024QAM-OFDM, 256QAM-OFDM, 16QAM-OFDM and QPSK-OFDM, or a combination using at least two of them; and a combination of 16PSK, 8PSK, QPSK and BPSK, or a combination using at least two of them. Any of the above-mentioned combinations enable the modulation in a single modulating circuit or a demodulation in a single modulating circuit. Thus, this has a merit of easily configuring a transmitter or a receiver. Also, it may be considered that a combination of FSK and QPSK used in the ITS field in relatively many cases has a merit of using an existing transmission/reception circuit in the field.

By the way, when the multi-office simultaneity transmission is done at a time of the hand-over as mentioned above, there is a merit that a lower baud rate is desirable in order to protect a mutual interference and obtain a diversity gain as much as possible.

As mentioned above, according to the fourth embodiment of the present invention, the communication can be smoothly switched from the first radio base station controller of the radio mobile station to the second radio base station controller. Thus, it is possible to easily control the hand-over process. Moreover, the hand-over process of the radio mobile station between the radio base station controllers can be made effective.

According to the present invention, it is possible to provide a radio communication system which can make the control of the hand-over process easier and improve the reliability of the communication.

According to the present invention, it is possible to provide a radio communication system which can make the control of the hand-over process easier and make the communication effective.

Various modifications will become possible for those skilled in the art after receiving the teachings of the present disclosure without departing from the scope thereof.

What is claimed is:

1. A radio base station controller which is remotely connected to a plurality of base stations arranged along a road and controls an antenna installed in each of the plurality of base stations and composed of a plurality of antenna devices in order to carry out a radio communication with mobile stations running on the road, the radio base station controller comprising:
   (a) an antenna controller configured to select at least one of the plurality of antenna devices from the plurality of base stations and set a weight of the at least one of the plurality of antenna devices to prevent interference between beam patterns generated by the plurality of antenna devices;
   (b) at least one modulating/demodulating device configured to modulate a signal which is transmitted to and demodulate a signal received from the mobile stations via the plurality of base stations, wherein the base stations do not modulate or demodulate the signals;
   (c) a device configured to detect each speed and each lane of the mobile stations;
   (d) a device configured to assign a channel to a group of the mobile stations running on same lane of the road; and
   (e) a device configured to change the channel in accordance with a change of the lane.

2. A radio base station controller which is remotely connected to a plurality of base stations configured to generate a plurality of beam patterns, the base stations carrying out a radio communication with a radio mobile station, the radio base station controller being configured to control an antenna, the antenna being installed in each of the base stations and being composed of a plurality of antenna devices, the radio base station controller comprising:
   an antenna controller configured to select at least one of the plurality of antenna devices from the plurality of base stations and set a weight of the at least one of the plurality of antenna devices to prevent interference between beam patterns generated by the plurality of antenna devices; and
   at least one modulating/demodulating device configured to modulate a signal which is transmitted to and demodulate a signal which is received from the radio mobile station via the plurality of base stations, wherein the base stations do not modulate or demodulate the signals,
   wherein the radio base station controller receives a transmission signal from the radio mobile station to follow the radio mobile station when there is no information to be transmitted from the radio mobile station to the base station controller and an interval of the transmission signal is changed depending on a change of the speed of the radio mobile station.

3. A radio base station controller which is remotely connected to a plurality of base stations configured to generate a plurality of beam patterns, the base stations carrying out a radio communication with a radio mobile station, the radio base station controller being configured to control an antenna, the antenna being installed in each of the base stations and being composed of a plurality of antenna devices, the radio base station controller comprising:
   an antenna controller configured to select at least one of the plurality of antenna devices from the plurality of base stations and set a weight of the at least one of the antenna devices to prevent interference between beam patterns generated by the plurality of antenna devices; and
   at least one modulating/demodulating device configured to modulate a signal which is transmitted to and demodulate a signal received from the radio mobile station via the plurality of base stations, wherein the base stations do not modulate or demodulate the signals,
   wherein the radio base station controller receives a transmission signal from the radio mobile station to follow the radio mobile station when there is no information to be transmitted from the radio mobile station to the base station controller.

* * * * *